(12) United States Patent
Reddy et al.

(10) Patent No.: US 12,445,996 B2
(45) Date of Patent: Oct. 14, 2025

(54) DISTRIBUTED TIME SYNCHRONIZATION FOR TIME DIFFERENCE OF ARRIVAL (TDOA) USING ULTRA-WIDEBAND (UWB)

(71) Applicant: QUALCOMM Incorporated, San Diego, CA (US)

(72) Inventors: Varun Amar Reddy, San Diego, CA (US); Alexandros Manolakos, Escondido, CA (US); Pooria Pakrooh, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 18/172,092

(22) Filed: Feb. 21, 2023

(65) Prior Publication Data

US 2023/0276403 A1    Aug. 31, 2023

Related U.S. Application Data

(60) Provisional application No. 63/268,592, filed on Feb. 25, 2022.

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0048* (2013.01); *H04W 72/0453* (2013.01); *H04W 72/1273* (2013.01)

(58) Field of Classification Search
CPC .......... H04W 64/003; H04W 72/0453; H04W 72/1273; H04W 56/0015; H04L 5/0048; G01S 5/0289; G01S 5/02216
See application file for complete search history.

(56) References Cited

U.S. PATENT DOCUMENTS

| 9,949,070 | B2 | 4/2018 | Park et al. |
| 2016/0193729 | A1* | 7/2016 | Williams ........... G01C 21/3856 901/1 |

(Continued)

FOREIGN PATENT DOCUMENTS

WO    WO-2021214647 A1    10/2021

OTHER PUBLICATIONS

Chen X., et al., "Network Scalability with Weight Analysis Based on UWB Indoor Positioning System", 2016 IEEE Conference on Wireless Sensors (ICWISE), IEEE, Oct. 10, 2016, pp. 95-99, XP033269498, DOI: 10.1109/ICWISE.2016.8188549, Sections II and III.

(Continued)

*Primary Examiner* — Siu M Lee
(74) *Attorney, Agent, or Firm* — Weaver Austin Villeneuve & Sampson LLP

(57) ABSTRACT

In some implementations, a current synchronization reference anchor for the group of RF positioning anchors may obtain metric information from each radio frequency (RF) positioning anchor of the group of RF positioning anchors. The current synchronization reference anchor may select the new synchronization reference anchor from the group of RF positioning anchors based at least in part on the metric information.

29 Claims, 14 Drawing Sheets

(51) Int. Cl.
*H04W 72/0453* (2023.01)
*H04W 72/1273* (2023.01)

(56) References Cited

U.S. PATENT DOCUMENTS

| | | | | |
|---|---|---|---|---|
| 2017/0150475 | A1* | 5/2017 | Li | H04W 76/23 |
| 2020/0287590 | A1* | 9/2020 | Torborg | H04B 1/7183 |
| 2021/0103023 | A1* | 4/2021 | Al-kadi | G01S 5/02216 |
| 2022/0329981 | A1* | 10/2022 | Xiao | G01S 5/0205 |
| 2022/0386214 | A1* | 12/2022 | Kim | G01S 5/10 |
| 2023/0194695 | A1* | 6/2023 | Janssens | G01S 13/76 |
| | | | | 342/27 |
| 2023/0276401 | A1* | 8/2023 | Reddy | H04W 64/00 |
| | | | | 455/456.1 |

OTHER PUBLICATIONS

International Search Report and Written Opinion—PCT/US2023/063086—ISA/EPO—May 26, 2023.

\* cited by examiner

DISTRIBUTED TIME SYNCHRONIZATION FOR TIME DIFFERENCE OF ARRIVAL (TDOA) USING ULTRA-WIDEBAND (UWB)

RELATED APPLICATIONS

This application claims the benefit of U.S. Provisional Application No. 63/268,592, filed Feb. 25, 2022, entitled "DISTRIBUTED TIME SYNCHRONIZATION FOR TDOA USING UWB", which is assigned to the assignee hereof, and incorporated herein in its entirety by reference.

BACKGROUND

1. Field of Disclosure

The present disclosure relates generally to the field of radiofrequency (RF)-based position determination (or positioning) of an electronic wireless device. More specifically, the present disclosure relates to ultra-wideband (UWB)-based positioning.

2. Description of Related Art

UWB-based positioning offers a highly accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. UWB-based positioning may be facilitated by groups or "clusters" of UWB devices known as "anchors." For certain types of positioning, such as time difference of arrival (TDOA), the respective clocks of these anchors may be synchronized to provide for precise transmission of signals, relative to each other.

BRIEF SUMMARY

An example method of designating a new synchronization reference anchor for a group of radio frequency (RF) positioning anchors to enable downlink Time Difference of Arrival (DL-TDoA) positioning of mobile devices, according to this disclosure, may comprise obtaining, at a current synchronization reference anchor for the group of RF positioning anchors, metric information from each RF positioning anchor of the group of RF positioning anchors. The method also may comprise selecting, with the current synchronization reference anchor, the new synchronization reference anchor from the group of RF positioning anchors based at least in part on the metric information.

An example device for designating a new synchronization reference anchor for a group of radio frequency (RF) positioning anchors to enable downlink Time Difference of Arrival (DL-TDoA) positioning of mobile devices, according to this disclosure, may comprise a transceiver, a memory, one or more processors communicatively coupled with the transceiver and the memory, wherein the one or more processors are configured to obtain, at a current synchronization reference anchor for the group of RF positioning anchors, metric information from each RF positioning anchor of the group of RF positioning anchors. The one or more processors further may be configured to select, with the current synchronization reference anchor, the new synchronization reference anchor from the group of RF positioning anchors based at least in part on the metric information.

An example apparatus for designating a new synchronization reference anchor for a group of radio frequency (RF) positioning anchors to enable downlink Time Difference of Arrival (DL-TDoA) positioning of mobile devices, according to this disclosure, may comprise means for obtaining, at a current synchronization reference anchor for the group of RF positioning anchors, metric information from each RF positioning anchor of the group of RF positioning anchors. The apparatus further may comprise means for selecting, with the current synchronization reference anchor, the new synchronization reference anchor from the group of RF positioning anchors based at least in part on the metric information.

According to this disclosure, an example non-transitory computer-readable medium stores instructions for designating a new synchronization reference anchor for a group of radio frequency (RF) positioning anchors to enable downlink Time Difference of Arrival (DL-TDoA) positioning of mobile devices, the instructions comprising code for obtaining, at a current synchronization reference anchor for the group of RF positioning anchors, metric information from each RF positioning anchor of the group of RF positioning anchors. The instructions further may comprise code for selecting, with the current synchronization reference anchor, the new synchronization reference anchor from the group of RF positioning anchors based at least in part on the metric information.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The appended drawings are provided to complement the following description. It can be noted that the term "background" is included in the text of many of the appended drawings to provide context for the embodiments described herein. It does not necessarily follow, however, that such information should be considered prior art. Some information identified as background in the appended drawings may comprise novel features used by one or more embodiments described herein.

Figure 1:
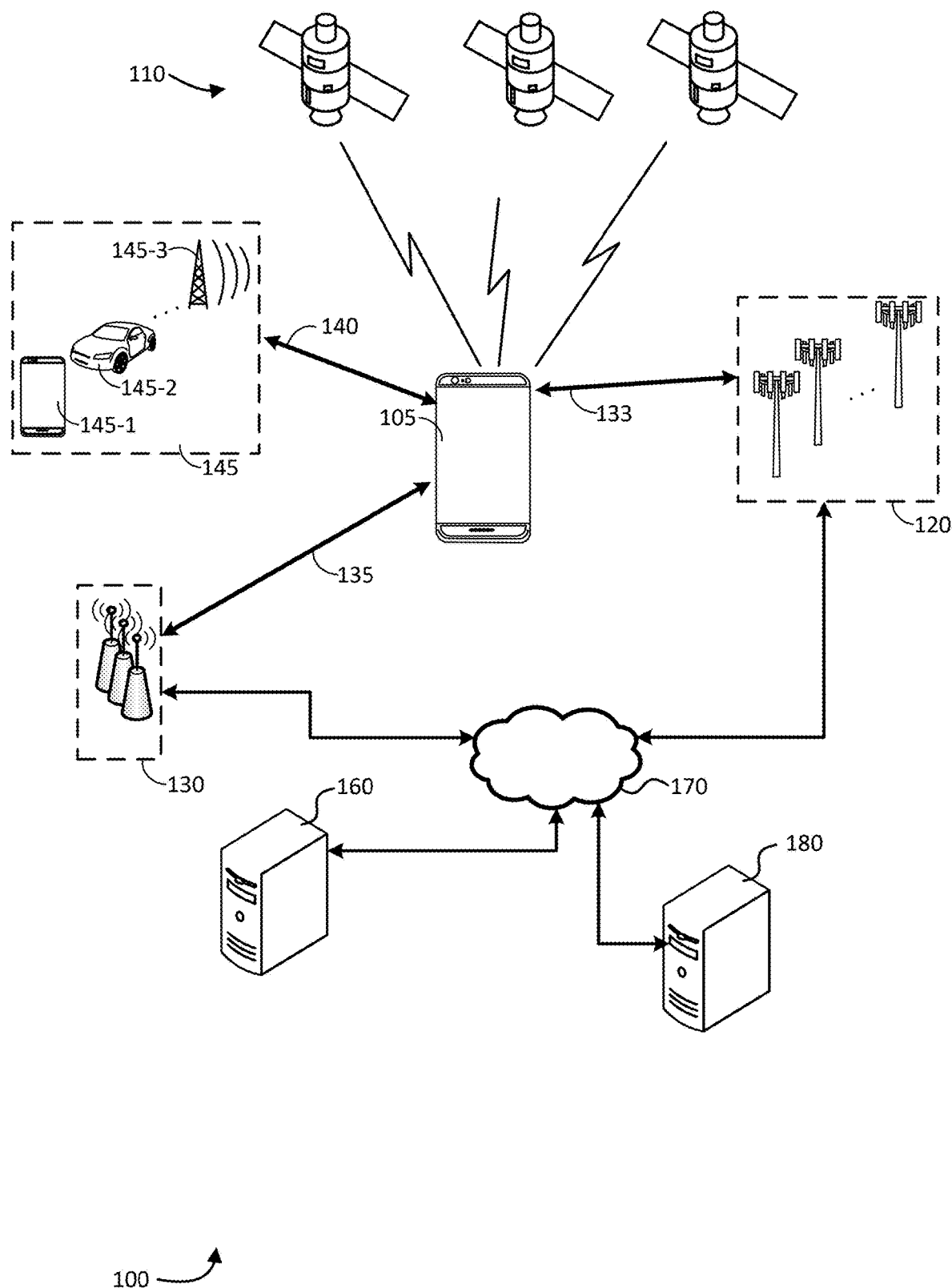
FIG. 1 is a diagram of a positioning system.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "positioning reference signals," "reference signals for positioning," and the like may be used to refer to signals used for positioning of a mobile device, such as a UWB device. As described in more detail herein, such signals may comprise any of a variety of signal types. Additionally, unless otherwise specified, references to "sensing reference signals," "reference signals for sensing," and the like may be used to refer to signals used for RF sensing (also generically referred to herein as "sensing") as described herein. A signal used for RF sensing and/or positioning may be generally referred to herein as a reference signal (RS). As described in more detail herein, such signals may comprise any of a variety of signal types but may not necessarily be limited to signals solely used for RF sensing.

Further, unless otherwise specified, the term "positioning," "position determination," "location determination," "location estimation," and the like, as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

UWB-based positioning offers a highly accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. UWB-based positioning may be facilitated by groups or "clusters" of UWB devices known as "anchors." For certain types of positioning, such as time difference of arrival (TDOA), the respective clocks of these anchors may be synchronized to provide for precise transmission of signals, relative to each other. Time synchronization of a network of overlapping clusters may be provided by a Global-anchor. However, traditional means for selecting a Global-anchor can be inefficient, and if a cluster network expands/changes, the need may arise for selecting a new Global-anchor that may be more effective at providing time synchronization for the changed network. To address these and other issues, embodiments herein provide techniques by which a Global-anchor for a cluster network can be selected.

Various aspects of this disclosure relate generally to positioning or ranging, particularly using UWB. Some aspects more specifically relate to the selection of a new Global-anchor for time synchronization in a network of UWB clusters. In some examples, an existing Global-anchor may receive one or more criteria for Global-anchor selection, which may be in addition to the number of hops between nodes and the number of nodes in the network. The Global-anchor may determine a weighted-closeness centrality (CC) value of different prospective Global-anchors based on a weighted sum of these criteria and select a new candidate Global-anchor accordingly. Moreover, according to embodiments herein, the Global-anchor can notify the candidate Global-anchor, which can send acknowledgment whether anchors in the network. To facilitate the scalability of the propagation of information within the cluster network, a new round structure may be implemented.

Particular aspects of the subject matter described in this disclosure can be implemented to realize one or more of the following potential advantages. In some examples, by providing for a CC value, the described techniques can provide for the selection of a Global-anchor that may be better suited for time synchronization and traditional techniques, enabling more accurate positioning. Moreover, by using a new round structure for propagating information within the cluster network, the selection of a new Global-anchor may be performed with relatively low latency, reducing a possible duration in time in which anchors in the network may not be synchronized to the new Global-anchor. These and other advantages will be apparent to a person of ordinary skill in the art in view of the embodiments described herein. Embodiments are described below, following a review of applicable technology.

Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system. FIG. 1 provides an example of such a positioning system.

FIG. 1 is a simplified illustration of a positioning system 100 in which a mobile device 105, location server 160, and/or other components of the positioning system 100 can use the techniques provided herein for positioning a mobile device 105, according to an embodiment. The techniques described herein may be implemented by one or more components of the positioning system 100. The positioning system 100 can include a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate the location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed in more detail with regard to FIGS. 2A and 2B.

It should be noted that FIG. 1 provides only a generalized illustration of various components, any or all of which may be utilized as appropriate, and each of which may be duplicated, as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. A mobile device of a cellular network (e.g., LTE and/or NR) also may be referred to as a User Equipment (UE).

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with the known position of the one or more components.

Although terrestrial components such as APs 130 and base stations 120 may be fixed, embodiments are not so limited. Mobile components may be used. For example, in some embodiments, the location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), UWB, IEEE 802.15x, or a combination thereof. Mobile devices 145 may additionally or alternatively use non-RF wireless signals for positioning of the mobile device 105, such as infrared signals or other optical technologies.

Mobile devices 145 may comprise UEs communicatively coupled with a cellular or other mobile network (e.g., network 170). When one or more other mobile devices 145 comprising UEs are used in the position determination of a particular mobile device 105, the mobile device 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. As described hereafter, UWB may be one such technology by which the positioning of a target device (e.g., mobile device 105) may be facilitated using measurements from one or more anchor devices (e.g., mobile devices 145). Measurements of distance between the target device and one or more anchor devices may be referred to herein as "ranging."

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate," "estimated location," "location," "position," "position estimate," "position fix," "estimated position," "location fix" or "fix." The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

As noted, positioning of the mobile device 105 may be facilitated by a location server 160, which may be part of a cellular network. Additionally or alternatively, the location server 160 may be capable of facilitating other types of network-based positioning, including positioning using APs 130 (e.g., Wi-Fi positioning) and/or mobile devices 145 (e.g., Bluetooth positioning, UWB positioning, etc.). To do so, the location server 160 may communicate with one or more devices (e.g., a target device such as the mobile device 105 and/or one or more anchor devices), coordinate positioning sessions with the one or more devices, provide assistance data for positioning-related measurements and/or calculations, receive measurement data from one or more devices for determining a position of a target device, provide synchronization-related data, or perform a combination these tasks, for example. According to some embodiments, the location server 160 may support various procedures/methods such as Assisted GNSS (A-GNSS), Time Difference Of Arrival (TDOA or TDoA) (which also may be referred to as Observed Time Difference Of Arrival (OT-DoA)), Real Time Kinematic (RTK), Precise Point Positioning (PPP), Differential GNSS (DGNSS), Enhance Cell ID (ECID), angle of arrival (AoA), angle of departure (AoD), WLAN positioning, RTT, multi-cell RTT, two-way ranging (TWR) (e.g., including single-sided TWR (SS-TWR) and/or double-sided TWR (DS-TWR)), and/or other positioning procedures and methods. The location server 160 may process location service requests for the mobile device 105 and/or third parties (e.g., a device communicatively coupled with the location server 160 and authorized to receive a position of the mobile device 105).

To support various positioning procedures/methods, the mobile device 105 and/or one or more anchor devices may be capable of performing any of a variety of measurements and/or procedures. This can include, for example, Received Signal Strength Indicator (RSSI), RTT, Reference Signal Received Power (RSRP), Reference Signal Received Quality (RSRQ), Reference Signal Time Difference (RSTD), Time of Arrival (ToA), AoA, Receive Time-Transmission Time Difference (Rx-Tx), Differential AoA (DAOA), AoD, or Timing Advance (TA).

In some embodiments, TDoA assistance data may be provided to a mobile device 105 by the location server 160 for a reference signal and one or more response or neighbor signals, relative to the reference signal. For example, the assistance data may provide timing, frequency, and/or other parameters of the reference and response/neighbor signals to allow a device (e.g., a target and/or anchor) to perform ToA and/or RSTD measurements for TDoA positioning. Using the RSTD measurements, the known absolute or relative transmission timing of each cell, and the known position(s) of wireless node physical transmitting antennas (e.g., anchors) for the reference and response/neighbor signals, the UE position may be calculated (e.g., by the mobile device 105 or by the location server 160). More particularly, the RSTD for a neighbor signal "k" relative to a reference signal "Ref," may be given as $(ToA_k - ToA_{Ref})$. ToA measurements for different signals may then be converted to RSTD measurements and sent to the location server 160 by the mobile device 105. Using (i) the RSTD measurements, (ii) the known absolute or relative transmission timing of each cell, (iii) the known position(s) of physical transmitting antennas that transmit the reference and response/neighbor signals, and/or (iv) directional characteristics of the signals such as a direction of transmission, the mobile device 105 position may be determined.

With regard to UWB-based positioning, UWB devices may conduct "sessions" during which the devices engage in direct communications (e.g., D2D communications) to coordinate the exchange of ranging frames from which ToA may be determined. Further, different types of measurements may be performed during these sessions to conduct the UWB-based position. A discussion of FIGS. 2A and 2B below provide examples of what types of measurements may be performed. A discussion of other figures below provides additional details regarding UWB positioning sessions.

UWB devices may vary in form and function. As indicated in FIG. 1, a UWB device may comprise a mobile device such as a mobile phone with UWB functionality. Similarly, UWB devices may comprise other personal electronics, such as laptops, tablets, personal media players, or the like. Further, as noted, UWB devices may comprise vehicles, drones, robots, or other mobile devices that may move autonomously, and may be used in consumer, industrial, military, and/or other applications. UWB devices may also comprise tracking devices used in logistical applications to track packages, shipping containers, or the like. Additionally or alternatively, UWB devices (such as UWB anchors, described hereafter) may comprise proprietary and/or dedicated RF beacons deployed at known locations for monitoring the location of tags or devices used in logistical applications and/or tracking applications (e.g., in a factory, warehouse, hospital, etc.). UWB devices may be used in proximity applications to, for example, unlock the door as a user (e.g., an authorized user) approaches. UWB devices may also be used in other applications and/or device types. Some UWB devices may also be deployed in a factory setting to monitor robots, assembled parts, or the like.

Figure 2A:
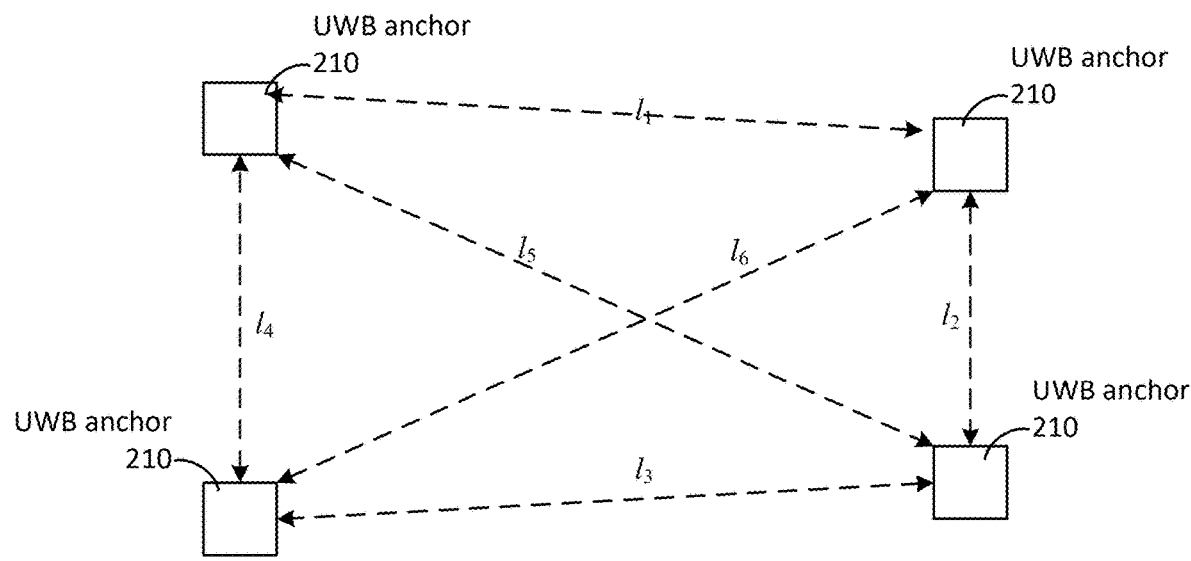
FIGS. 2A and 2B are simplified diagrams illustrating how ultra-wideband (UWB) positioning may be performed in a group of UWB anchors, according to some embodiments.
Figure 2B:
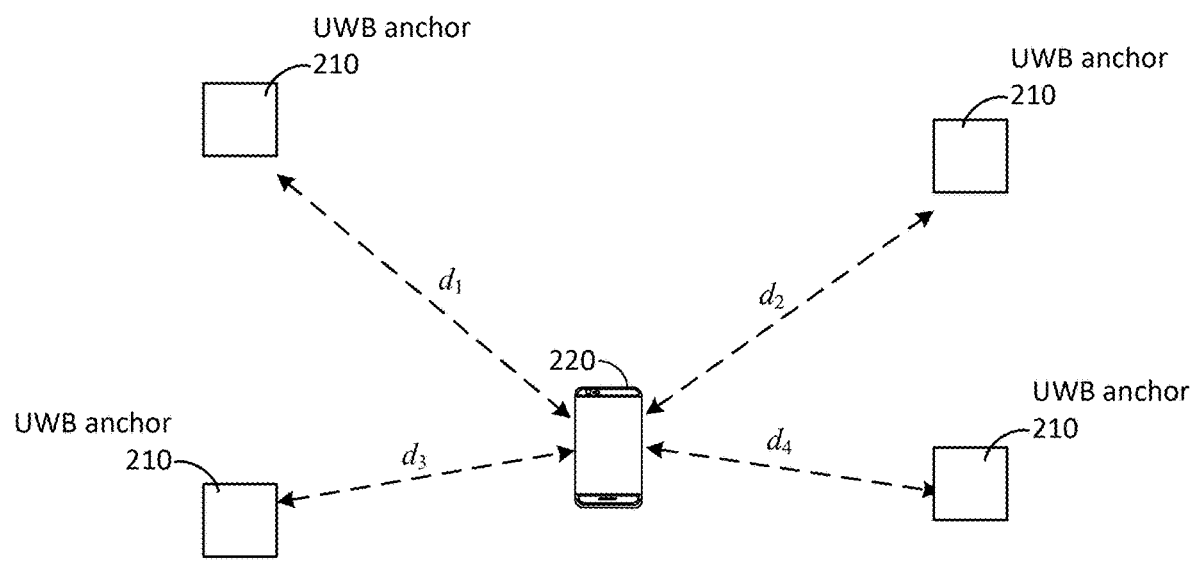

FIGS. 2A and 2B are simplified diagrams illustrating how UWB positioning may be performed in a group of UWB anchors 210. As noted, anchor devices (referred to herein as "anchors" or "UWB anchors") may comprise UWB devices with known locations that can be used to determine the position of a target 220, or "tag," using UWB RF signals. UWB positioning may be performed utilizing relevant standards (e.g., IEEE 802.15.4ab), which enable high-accuracy, low power positioning. One or more of the UWB anchors 210 and/or UWB target 220 may be connected with a network, such as in the manner illustrated in the positioning system 100 of FIG. 1. In some embodiments, the UWB anchors 210 and/or UWB target 220 may form an ad-hoc network, which may or may not be connected with a network (e.g., in the manner shown in FIG. 1). Further, the UWB anchors 210 and/or UWB target 220 may comprise any of a variety of device types, as previously indicated.

If the position of one or more UWB anchors 210 is not yet known, such as in an ad-hoc network, an initial provisioning of the UWB anchors 210 may be performed. In the provisioning, UWB anchors 210 may perform ranging measurements to determine relative distances (l1-l6) between UWB devices 210, as illustrated in FIG. 2A. This can enable the UWB anchors 210 to determine the relative locations with one another and, if the absolute location of any UWB anchor 210 is known, the absolute locations (e.g., with respect to a coordinates system). Once the positions of the UWB anchors 210 is known, the determination of location of a target 220 can be made by determining the distances (d1-d6) between the UWB anchors 210 and target 220. These distances can be determined using a variety of positioning-related measurements and/or procedures. This can include, for example, RSTD, ToA, two-way ranging (TWR) (e.g., including single-sided TWR (SS-TWR) and/or double-sided TWR (DS-TWR)), TDoA, and more. Additionally or alternatively, angle-based measurements may be made for positioning of the target 220, including angle of arrival (AoA) and/or Angle of departure (AoD).

As noted, a group of UWB anchors 210 may conduct sessions in which UWB anchors 210 perform a series of operations to determine the position of one or more of the devices, and during which the UWB anchors 210 engage in direct communications (e.g., D2D communications) to coordinate the exchange of data, synchronize (e.g., for TDoA positioning). A group of UWB anchors 210 may be called a "cluster," and a network of UWB devices may comprise multiple clusters. Each cluster may include any number of UWB anchors 210, and different clusters may overlap, such that one or more UWB anchors 210 may be a part of one or more different clusters.

Figure 3A:
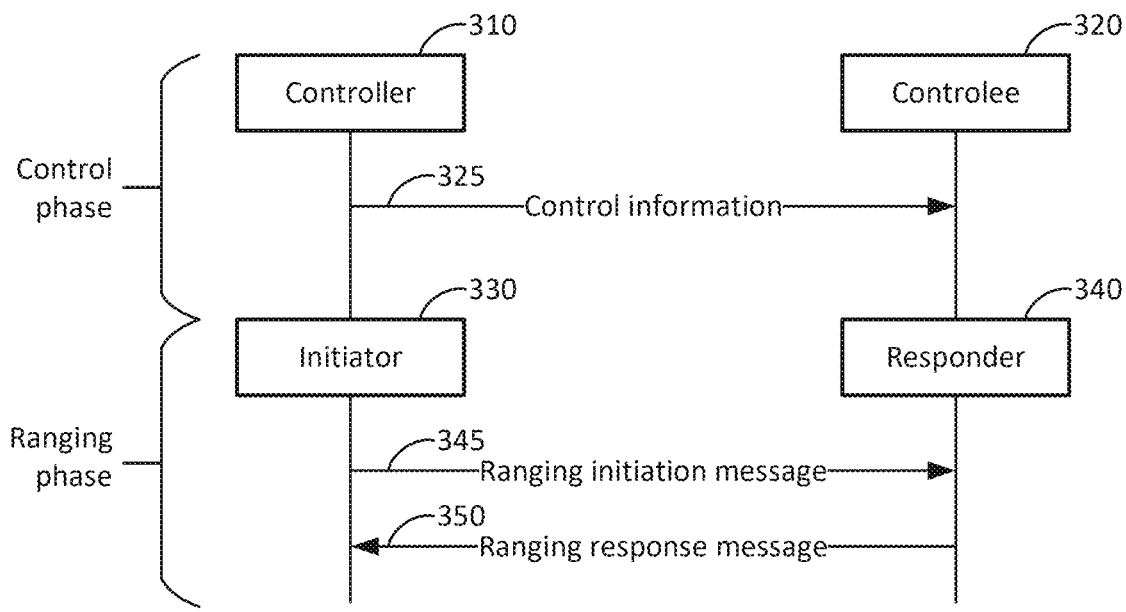
FIGS. 3A and 3B are message flow diagrams illustrating the roles different devices may assume with regard to a UWB positioning or ranging session, according to some embodiments.

FIG. 3A is a message flow diagram illustrating the roles different devices may assume with regard to a UWB ranging session (or simply a "UWB session"), which may be conducted in accordance with a relevant UWB positioning standard (e.g., IEEE 802.15.4ab). Here, each UWB device may be referred to as an enhanced ranging device (ERDEV). ERDEVs may be referred to different terminologies (e.g. initiator/responder or controller/controlee) at different layers of the network stack. The terms initiator and responder (described hereafter) would be used at lower layers (e.g., at UWB physical (PHY) and media access control (MAC) layers), while the terms controller and controlee (also described hereafter) may be used at higher layers (e.g., an application layer of the ERDEVs).

As indicated, for a pair of ERDEVs communicating with each other, the controller 310 is an ERDEV that sends control information 325 to a receiving ERDEV, designated as the controlee 320. The control information 325 may include parameters for the UWB ranging session, such as timing, channel, etc. Although not illustrated, the controlee 320 can send an acknowledgment to the control information 325, may negotiate changes to the parameters, and/or the like.

The exchange between controller 310 and controlee 320, including the sending of the control information 325 and subsequent related exchanges between controller 310 and controlee 320 regarding control information, may be conducted out of band (OOB) using different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 310 and controlee 320 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round). Accordingly, some aspects of the control phase may be considered to occur in band, subsequent to the preliminary OOB exchange between controller 310 and controlee 320.)

The UWB session may occur afterward, in accordance with the parameters provided in the control information. In the ranging phase of the UWB session, one ERDEV may take the role of an initiator 330 and the other ERDEV may take the role of a responder 340. As indicated in FIG. 3A, the initiator 330 may initiate UWB ranging by sending a ranging initiation message 345 to the responder 340, to which the responder 340 may reply with a ranging response message 350, and timing measurements may be made of these messages (by the devices receiving the messages) to perform two-way ranging (TWR). Depending on the parameters of the control information 325, additional exchanges may be made in the ranging phase between the initiator 330 and responder 340 to allow for additional ranging measurements.

Figure 3B:
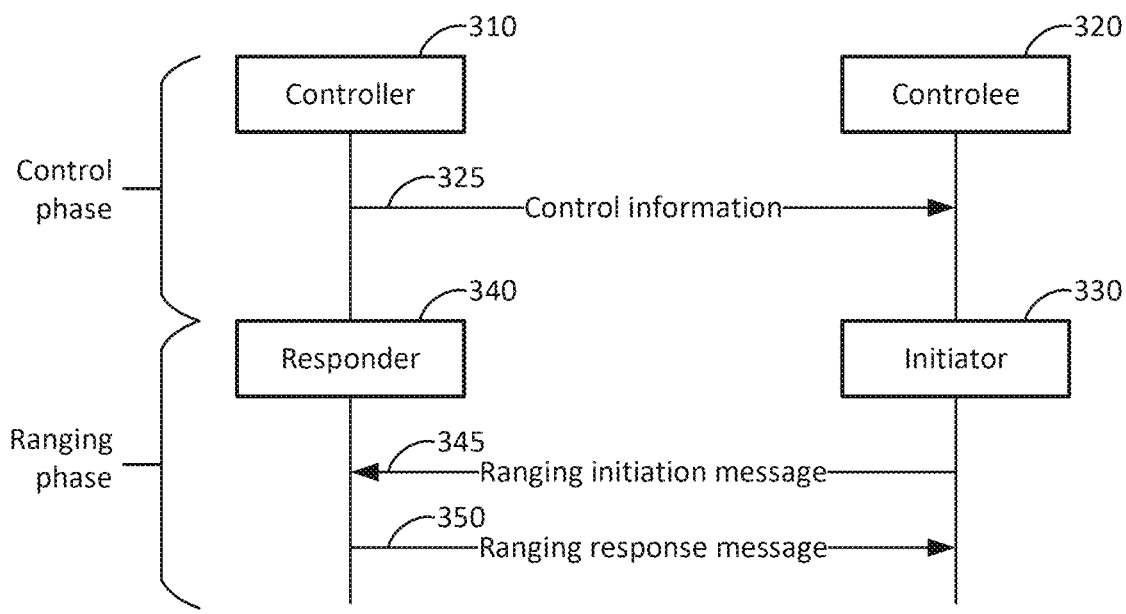

The roles of initiator 330 and responder 340 may be indicated in the control information 325. Further, as indicated in FIG. 3A, the controller 310 in the control phase may be the initiator 330 in the ranging phase of the UWB session. Alternatively, as indicated in FIG. 3B, the controller 310 in the control phase may be the responder 340 in the ranging phase. The determination of which device is initiator 330 and which is responder 340 may depend on the parameters set forth in the control information 325, in which case the controlee 320 correspondingly becomes either the responder 340 or the initiator 330. According to some embodiments, a controller/initiator may conduct ranging with multiple controlees/responders.

Figure 4:
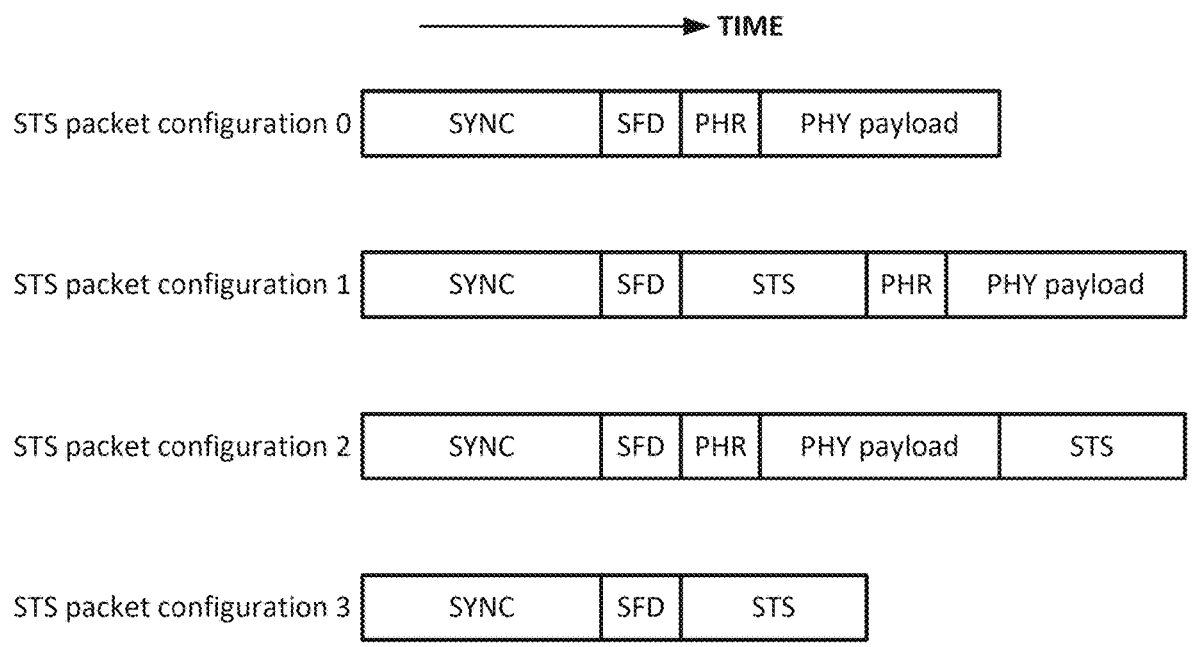
FIG. 4 is an illustration of different packet configurations that can be used in a UWB session at the UWB physical (PHY) layer, according to some embodiments.

FIG. 4 is an illustration of different packet configurations that can be used in a UWB session (e.g., for sensing and/or positioning) at the UWB PHY layer, which may be used in some embodiments (e.g., in ranging initiation and/or response messages, as shown in FIGS. 3A and 3B above). These packet configurations may be defined and/or used in relevant UWB standards (e.g., IEEE 802.15.4z). As shown, ranging functionality may be based on channel estimation using the SYNC preamble, included in each of the for possible configurations (e.g., configurations 0-3) used in current configurations. (Configuration 0 is currently used as a default configuration.) The SYNC preamble may comprise a bit sequence (such as a Ipatov ternary sequence, Gold sequence, Golay sequence, polyphase sequence like Zadoff-Chu sequence, etc.) that exhibits good autocorrelation properties (e.g., sufficient for ranging/sensing measurements). As illustrated, the different packet configurations may also include a start of frame delimiter (SFD) to help demarcated the SYNC preamble from the rest of the packet, a PHY payload for conveying data (e.g., for communication, timestamp information, etc.), and/or a scrambled timestamp sequence (STS). The STS is a security feature with a unique sequence known to transmitter and receiver, which can authenticate the data packet source and help prevent over-the-air attacks that can falsify a ToA estimate for ranging/sensing in a UWB session.

Figure 5:
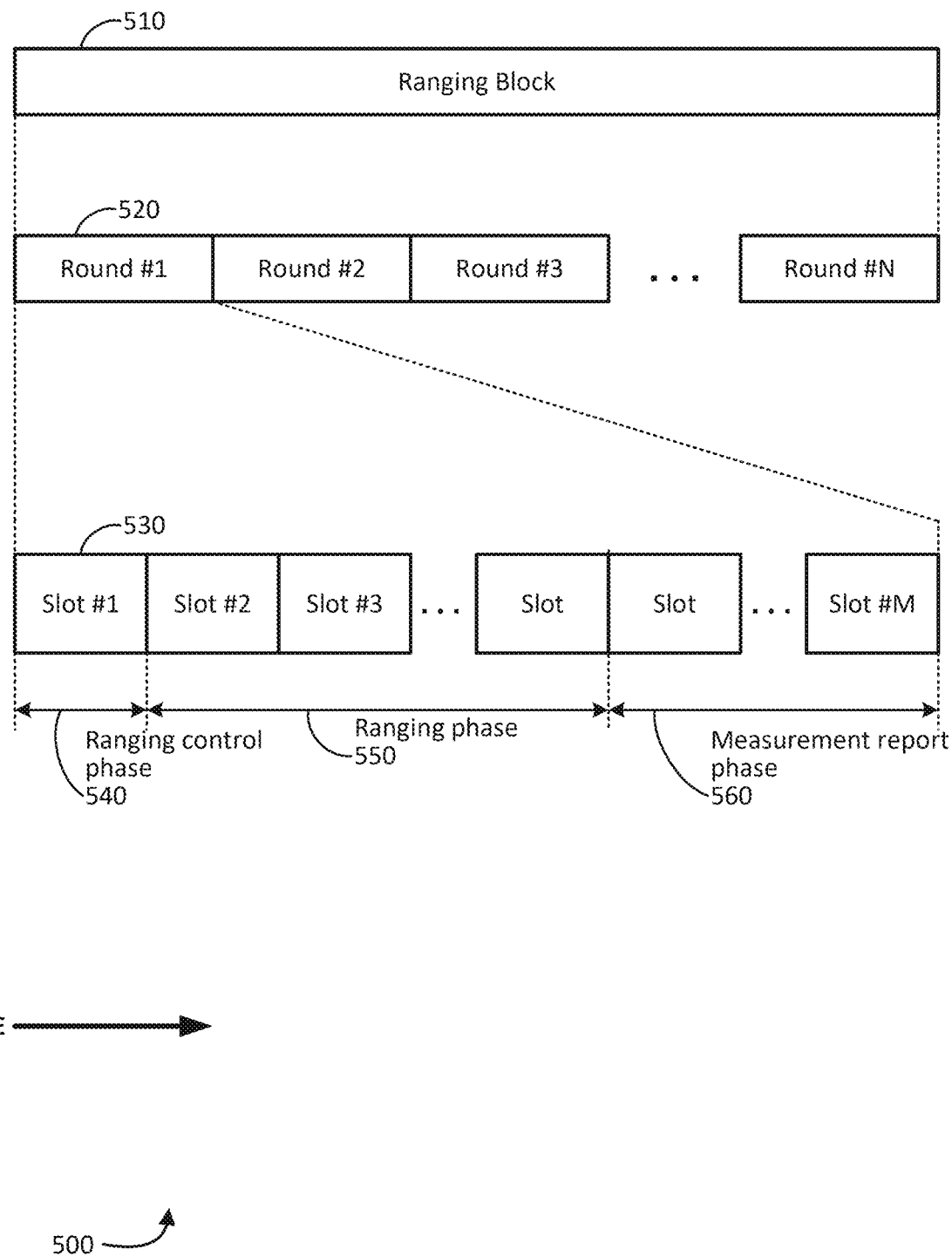
FIG. 5 is a diagram illustrating how time may be segmented and utilized within a UWB positioning session, according to some embodiments.

FIG. 5 is a diagram 500 illustrating how time may be segmented and utilized within a UWB positioning session, which may be used in some embodiments. A UWB session may occur over a period of time divided into sub-portions according to a hierarchical structure. This timing comprises one or more consecutive ranging blocks 510, which may have a configurable duration (e.g., 200 ms). (For simplicity, only one ranging block 510 is shown in FIG. 5. However, a UWB session may utilize multiple blocks, which may occur in succession. Also, although called "ranging" blocks 510, they may be used for ranging and/or sensing.) Each ranging block 510 may be split into one or more successive rounds 520 (e.g., N rounds). The number and length of the rounds may be configurable. The rounds 520 may be further split into different slots 530, which also may have a configurable number and length (e.g., 1-2 ms). According to some embodiments, multiple rounds may be used for interference handling. For example, a given responder may transmit a message within only a single round per block, and the round index may either be statistically configured by the controller or selected per a hopping pattern.

The slots within round 520 may be allocated for different purposes. For example, the initial slot may be dedicated as the ranging control phase 540, in which an initiator UWB device (e.g., an initiator anchor), transmits control information for the other UWB devices participating in a UWB session (e.g., responder anchors and/or other UWB devices). This information can include, for example, an allocation of slots among the different responder devices. During the subsequent ranging phase 550, the different responder may transmit in accordance with the allocated slot. That is, each responder may be allocated a corresponding slot in the ranging phase 550 to transmit one or more ranging/sensing signals. The ranging phase 550 may be followed by a measurement report phase 560 in which UWB anchors in a cluster may report measurements (e.g., of signals measured during the ranging phase 550). Sequential slots may be used to perform SS-TWR or DS-TWR, for example. The structure of the initiation and/or response messages may use the PHY format previously described with respect to FIG. 4. Multiple UWB sessions can be time-multiplexed to help prevent interference with one another.

Figure 6A:
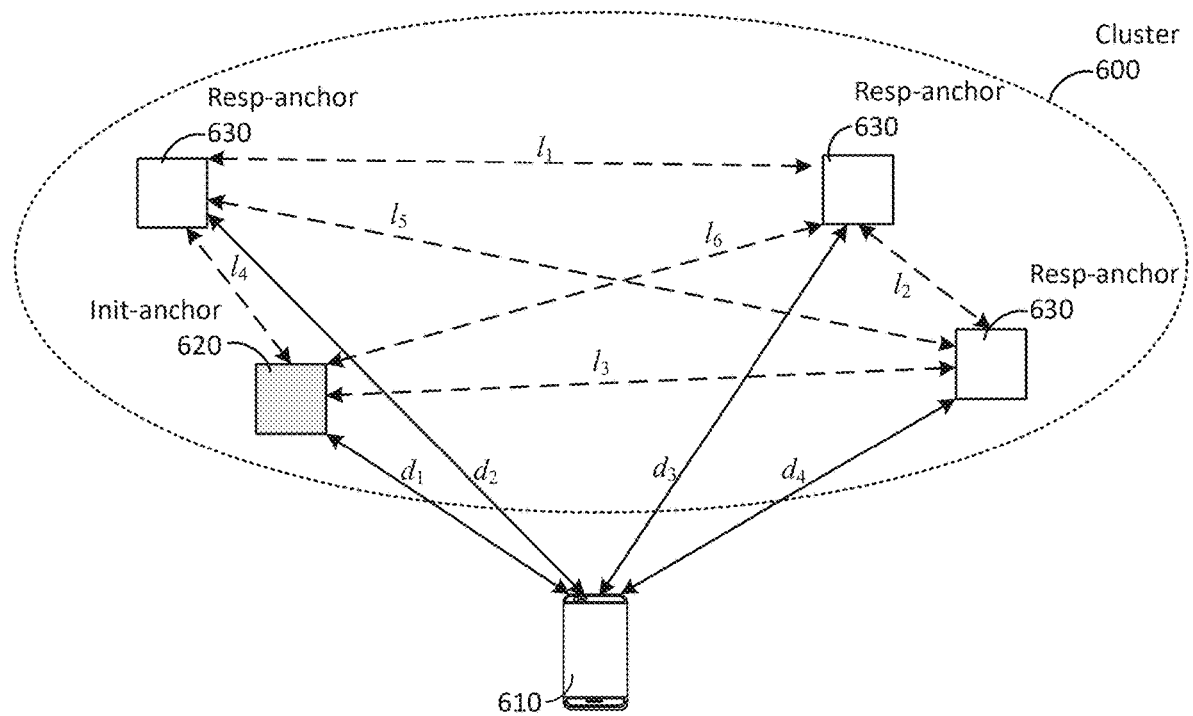
FIG. 6A is a diagram illustrating an example cluster of anchors, according to an embodiment.

FIG. 6A is a diagram illustrating an example cluster 600 of anchors, according to an embodiment. FIG. 6A combines FIGS. 2A and 2B to illustrate how a cluster 600 of anchors can determine the location of a UWB device 610 using ranging to determine values for d1-d4. In particular, cluster 600 may allow for the positioning of the UWB device 610 using TDOA measurements in UWB. In other words, the UWB device 610 can, for each anchor in cluster 600, precisely measure the reception time of a message (e.g., downlink TDOA messages (DTM)) sent by the anchor. Using reception times and obtained coordinates of the anchors, the UWB device 610 may estimate its position. For a cluster 600 providing the TDOA, a UWB device 610 and anchors of a cluster 600 may be respectively referred to as a downlink TDOA (DT)-tag and DT-anchors. According to some embodiments, positioning supported by a cluster 600 may be made in accordance with applicable standards by FiRa™, the standards organization comprising a consortium of multiple member entities developing standards for UWB ranging and positioning.

A cluster is a set of anchors that exchange messages with each other to provide a localization service. According to some embodiments, OOB messaging (e.g., OOB configurations messages sent via Bluetooth) may be sent by the Init-anchor 620 to create the cluster 600 of anchors within a cluster area. To support TDOA positioning, anchors provide DTMs with each other to provide TDOA localization to DT-tags. As illustrated in FIG. 6A, a cluster 600 may comprise a single initiator anchor (Init-anchor) 620 and one or more responder anchors (Resp-anchors) 630. As described in more detail hereafter, the Init-anchor 620 can coordinate the DTM transmissions by the anchors within the cluster 600.

Figure 6B:
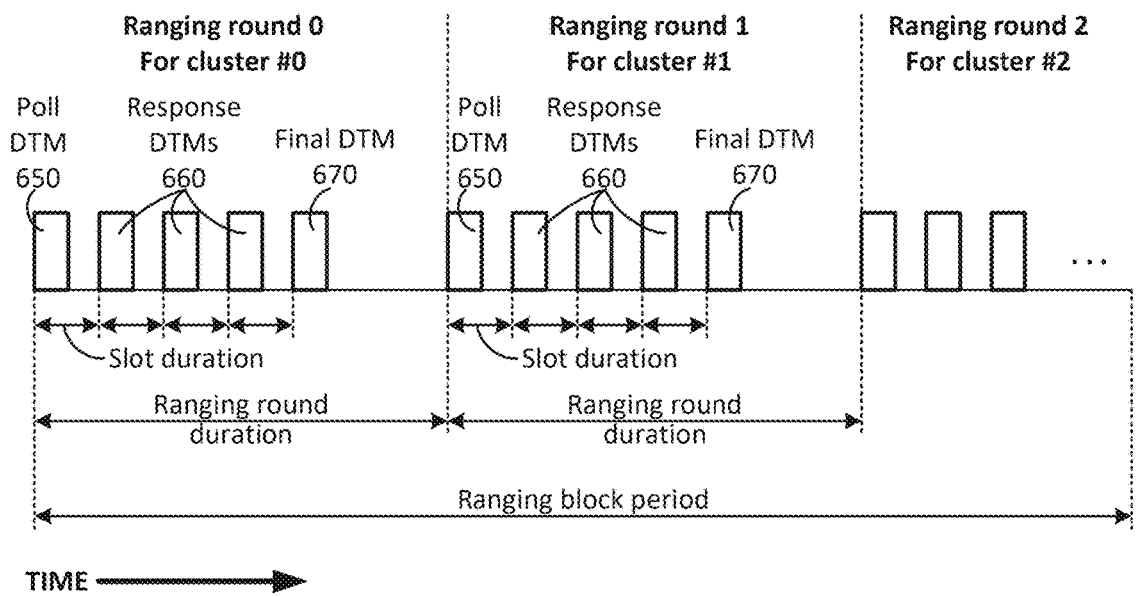
FIG. 6B is a timing diagram illustrating an example series of transmissions that may be used in UWB clusters, according to some embodiments.

FIG. 6B is a timing diagram illustrating an example series of DTM transmissions that may be used in one or more UWB sessions, according to an embodiment. As shown, different ranging rounds may be designated for different clusters. The cluster 600 of FIG. 6A, for example, may correspond with cluster #0 in FIG. 6B, and different clusters may correspond with clusters #1 and #2 in FIG. 6B. An anchor may be a part of multiple clusters, and an Init-anchor in one cluster may be a Resp-anchor in another.

As illustrated, each ranging round may comprise a poll DTM 650 transmitted by an Init-anchor of the respective cluster (e.g., Init-anchor 620), followed by response DTMs 660 transmitted by Resp-anchors (e.g., Resp-anchors 630). It can be noted that the number of response DTMs 660 may vary in accordance with the number of Resp-anchors in a given cluster. (As such, different ranging rounds may have different numbers of response DTMs 660.) According to some embodiments, in addition to or as an alternative to providing positioning (e.g., using the differential timing to perform TDOA), the DTM messages also may be used for synchronization between the anchors. Further, a final DTM message 670 may be optional. Note that only anchors exchange messages, whereas any UWB devices that use the messages for positions may passively listen and receive packets.

Figure 7A:
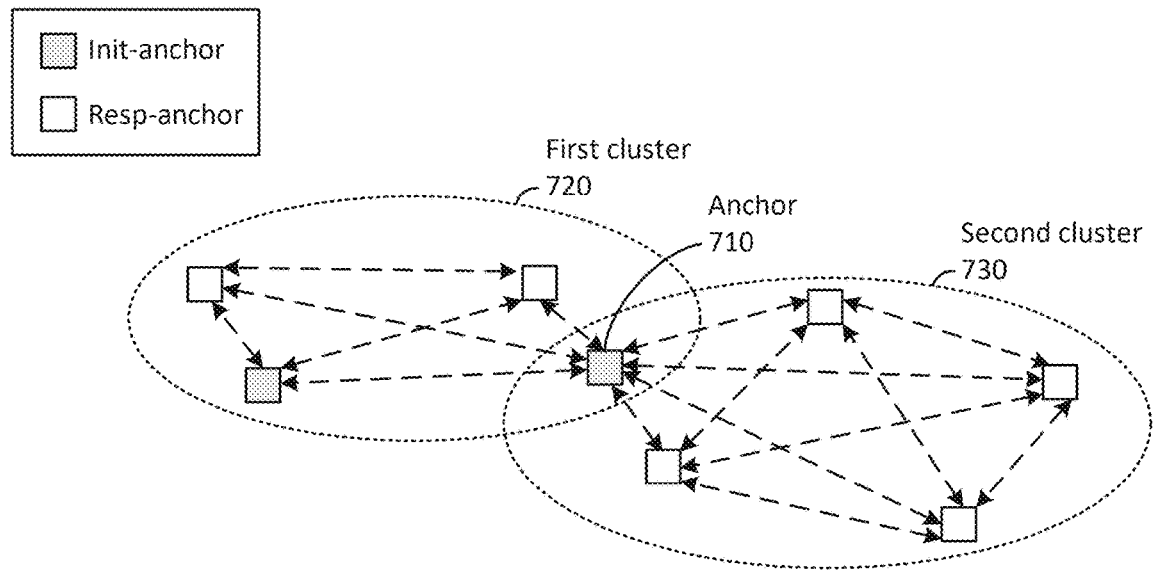
FIG. 7A is a diagram illustrating an example of how clusters may overlap, according to some embodiments.

FIG. 7A is a diagram illustrating how clusters may overlap, according to some embodiments. As noted, an anchor may be part of one or more clusters, and the overlap between two clusters may comprise one or more anchor from each cluster. In the example of FIG. 7A, for instance, anchor 710 is part of both the first cluster 720 and second cluster 730. As such, the anchor 710 will transmit DTM messages (e.g., as discussed with regard to FIG. 6B) in both the first cluster 720 and second cluster 730. Thus, multiple overlapping clusters can form a larger network of UWB anchors.

As noted, within a cluster of anchors, the Init-anchor and Resp-anchor(s) exchange messages to facilitate synchronization, maintaining a common clock (within an allowable degree of error). A network comprising multiple clusters comprising overlapping anchors may cover overlapping regions to allow UWB coverage across a larger area. Synchronization across clusters can be performed so that, as illustrated in FIG. 6B, clusters may use a common channel (e.g., a common ranging block structure) but different ranging rounds. To do so, a single anchor (typically an Init-anchor) within the network (group of clusters) can be selected as a "Global-anchor" to provide the time reference for the whole network. Overlapping anchors between clusters can communicate timing information from one cluster to another.

Figure 7B:
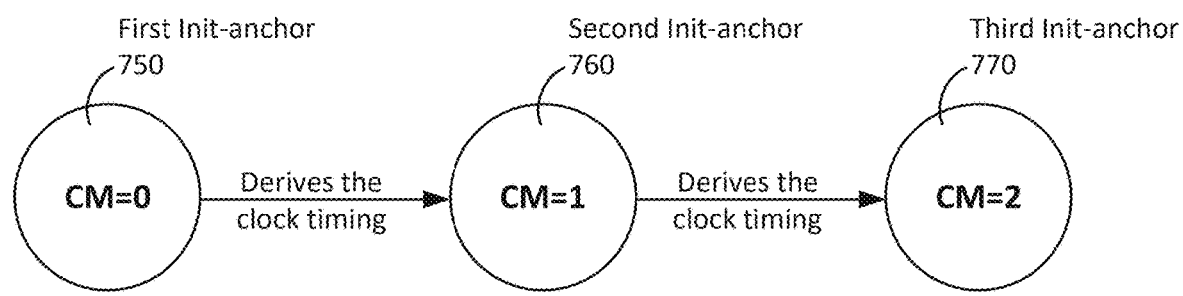
FIG. 7B is a diagram that illustrates how timing information may be communicated across clusters, according to some embodiments.

FIG. 7B is a diagram that illustrates how this timing information may be communicated, according to some embodiments. In inter-cluster synchronization, a cost metric (CM) can be calculated to determine "a degree of proximity to the anchor providing a common time base to establish a synchronization hierarchy or tree within a multi-cluster deployment." Put differently, the cost metric for a given anchor may be considered the number of hops between a global-anchor and the given anchor. In the example illustrated in FIG. 7B, the first Init-anchor 750 has a CM of 0; a second Init-anchor 760, which derives its clock timing from the first and Init-anchor 750, has a CM of 1; and the third Init-anchor 770, which derives its clock timing from the second and Init-anchor 760, as a CM of 2. Because each hop can introduce a timing error, a lower from CM an anchor means synchronization messages from the anchor are likely to have less timing error. Thus, it may be desirable for an anchor having the lowest CM (e.g., lowest average CM across all anchors in the network) to be selected as the Global-anchor for the network, although current governing standards may not allow for the selection of such an anchor.

When inter-cluster synchronization is enabled, the CM is present in the Poll DTM message and the Response-DTM messages (that also serve as Init-anchors in another cluster). (As shown in FIG. 5, the Init-anchors transmitting the poll DTM message may increase the CM value by 1.) This allows a new anchor to scan these messages from several clusters and then select the best Init-anchor/cluster (with the lowest cost metric) for synchronization. The use of the CM in this manner can help increase the accuracy of inter-cluster synchronization.

Proposals in current related standards currently do not clearly describe how an Init-anchor is selected within a cluster. A default approach is expected to involve a "Bluetooth advertiser" that broadcasts OOB configuration messages and creates a cluster of anchors within its coverage area. However, there currently is no description of how an Init-anchor can be changed, and the CM parameter has only been defined for Init-anchors.

When there are several overlapping clusters, it would be preferable to have an Init-anchor that has maximal coverage across the clusters. For example, an Init-anchor near the middle of a network is likely to have better coverage (lower overall CM) than an Init-anchor near the edge of the network. This would reduce errors related to multi-hop synchronization and can also enable cross-cluster TDoA for the DT-Tag. Again, however, current governing standards do not necessarily provide for the selection of such an Init-anchor as the global-anchor.

Embodiments herein address these and other issues by providing for enhancements that can be made with regard to UWB device synchronization for DL-TDoA positioning. For example, some embodiments may provide criteria for the selection of the global-anchor and/or protocol for synchronization across the infrastructure/network of anchors (e.g., group of anchor clusters). Additionally or alternatively, embodiments can use a distributed approach, for example, regarding the protocol for synchronization.

Use cases for such synchronization embodiments may include, for example, an ad-hoc infrastructure of anchors that are self-managed and/or self-organized. Another use case may comprise a group of drones to perform surveillance or surveys large areas, and which may enable DL/UL-TDoA positioning. This can be used, for example, in disaster management, emergency services in remote areas, wildlife and agricultural monitoring, military applications, etc. Other use cases may include emergency positioning services, such as a group of firefighters in a dense urban scenario (in which case the UL-TDOA could be used for positioning the firefighters, equipment, etc.). This can provide a more scalable and power-conserving solution, for example, as compared with RTT-based approaches. The proposed ideas for synchronization enhancements provided herein with respect to UWB also can be extended to 3GPP Rel-18 sidelink (SL) scenarios in 5G NR.

According to embodiments herein, one or more criteria for Global-anchor selection can enhance the basic CM description as previously described or may be used in addition or as an alternative to a CM. Again, the Global-anchor may comprise the Init-anchor that provides a common time reference to the entire network. Further, and as previously noted, the Init-anchor for a given cluster is selected through OOB setup by the "Bluetooth advertiser."

With respect to the criteria itself, some criteria that can be used to select the Global-anchor and/or the Init-anchor with a cluster may include any combination of the following:

Access to a global time source (such as UTC) with superior clock stability. anchors with access to a source with clock stability may be favored over those without such a source. Such sources may comprise a 5G-NR base station or a GPS source, for example. Relatedly, the quality (e.g., SNR) of the received timing signal from the source by the anchor may be a factor.

Clock stability of the anchor. With regard to this factor, anchors with better clock stability would be favored over those with poorer clock stability.

Ground truth accuracy. Because the timing of other anchors relative to an anchor may be impacted by a distance of the other anchors to the anchor, an accurate knowledge of the location of the anchor can help ensure reduce/minimize location-related timing errors. Thus, an anchor with greater ground truth accuracy may be more favorable than one with poorer ground accuracy as a global-anchor/Init-anchor.

Geographic location. An anchor with maximal coverage of the region may be favorable. For example, an anchor that is closest to the center of the region served by a cluster may be selected as the Init-anchor, and/or the anchor that is closest to the center of the network may be selected as the global-anchor. Alternatively, location can be considered among other factors. Graph-theory analysis can also be used (as described hereafter).

Prevalence of LoS links and high-quality ToA estimation. As an example, an anchor that is at the ceiling (provided, for example, the geometry of the environment is known a-priori) may be preferable to one located elsewhere, given that it is more likely to have a larger number of LOS links to other anchors. Relatedly, according to some embodiments, the RSRP of the signals received from an anchor also may be a key metric.

Power consumption information. Whether an anchor is battery-powered or connected to a stable power supply can be a factor. An anchor connected to a stable power supply may be preferable over one powered by a battery or unstable power source.

The above criteria can also be used by a new potential anchor to select from a group of Init-anchors that it wishes to synchronize with, in addition or as an alternative to using the CM. For example, a new potential anchor capable of communicating with a plurality of Init-anchors may select the Init-anchor with which it connects (e.g., joins the cluster of the Init-anchor) based on one or more of the criteria listed in FIG. 8 (which may be in addition or as an alternative to CM).

According to some embodiments, a graph-theory analysis can be used as a consideration for determining an Init-anchor (e.g., for a cluster and/or as a global-anchor) for synchronization. As previously noted, it may be used in addition to other criteria, according to some embodiments. In such embodiments, a weighted-closeness centrality (CC) can be calculated to indicate how close a node (anchor) is to the other nodes in the network. The CC, may be calculated as the average of the shortest path length from the node to every other node in the network, as follows:

$$CC_x = \frac{N}{\sum_y w_y d_{x,y}}$$

where $CC_x$ is the CC for node x, $d_{x,y}$ is the distance or number of hops between nodes x and y, and N is the total number of nodes. The parameter/weight $w_y$ indicates a quality of the link and/or anchor for achieving synchronization, related to criteria (clock stability, ground truth accuracy, etc.) described above. In other words, parameter/weight $w_y$ can be seen as a value representing one or more of the above-described criteria. (Setting this value to 1 may be an alternative way for determining a CM.)

Additionally or alternatively, the mean value of the CM across all anchors can also serve as a metric to determine the best anchor for providing a common time source. The lower the mean, the closer the time reference is to the center of the graph of nodes.

The CC be used to update an Init-anchor of a cluster and/or a Global-anchor of a network of clusters. As previously noted with respect to FIG. 6B, clusters in a network may be synchronized to use a common ranging block, where each cluster uses a different round within the ranging block. This timing structure allows for communications from the Init-anchor of one cluster to the Init-anchor of another cluster and is compliant with current governing specifications. A distributed protocol for updating an Init-anchor of a cluster and/or a Global-anchor of a network of clusters may leverage this timing structure, as indicated in FIG. 8, described below.

Figure 8:
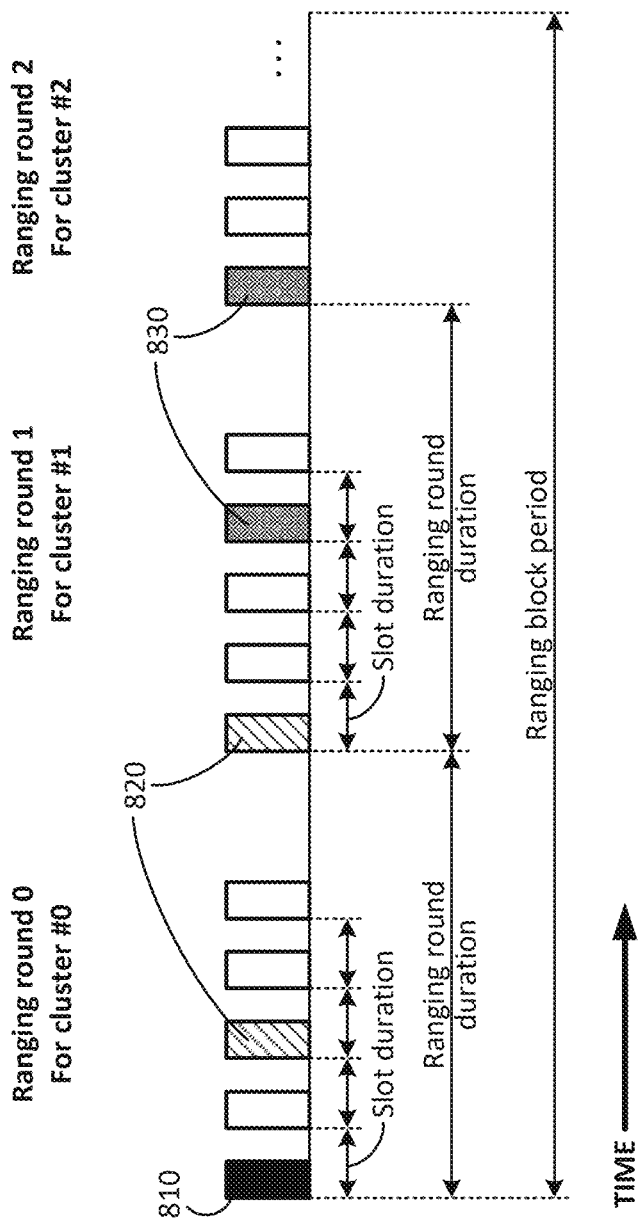
FIG. 8 is a timing diagram illustrating downstream communications in a cluster network that can be performed, according to some embodiments.

FIG. 8 is a timing diagram similar to FIG. 6B, illustrating how downstream communications in a cluster network can work, according to some embodiments. Shaded slots in the graph illustrate slots corresponding to different Init-anchors, where different shades represent different Init-anchors. Within each round, the Init-anchor of the respective cluster corresponding to the round can include downstream communications in the poll DTM message (e.g., the first message of the round), which may be received by an Resp-anchor that serves as an Init-Anchor in an adjacent cluster. In the round for the adjacent cluster, the Init-Anchor for that cluster can then include the downstream communications in the respective poll DTM message. According to some embodiments, downstream information regarding updating the global-anchor can include a table of CC-based metrics for all the Init-anchors in the network.

As shown in FIG. 8, information may be sent from a first anchor 810 to a second anchor 820, and then to a third anchor 830. Specifically, the first anchor 810 may comprise an Init-anchor for cluster #0, which transmits a poll DTM in the first slot of round 0. The second anchor 820, which is a Resp-anchor in cluster #0 and the Init-Anchor of cluster #1, receives the information in the poll DTM for cluster #0 and relays the information in the poll DTM for round 1. Similarly, the third anchor 830, which is a Resp-anchor in cluster #1 and the Init-Anchor of cluster #2, receives the information in the poll DTM for cluster #1 and relays the information in the poll DTM for round 2. Each round therefore provides an opportunity for adjacent Init-Anchors to exchange and update "CC-tables" (tables including CC metrics for multiple anchors) with one another. Upstream information can be communicated similarly, where upstream information is sent from Resp-anchor (during a Resp-DTM message/slot) to an Init-anchor.

According to some embodiments, the change to a new Global-anchor may be initiated by the existing Global-anchor. Here, each Init-anchor may maintain a closeness metric (e.g., CC metric, which may be based on one or more criteria, as described above) with the other Init-Anchors from other clusters. This information can be exchanged and propagated by all anchors in the network. To do this, embodiments may utilize a new information element (IE) in a Message Control field of DTM messages shared by Init-Anchors. Using this metric information regarding Init-anchors that is shared among anchors in the network, the Global-anchor can initiate the process for designating a new Global-anchor selected from the Init-anchors of the network. That is, the current Global-anchor can analyze this metric information (e.g., periodically or when relevant metric information changes) to determine whether another Init-anchor is a better candidate for the Global-anchor of the network. If the new Global-anchor candidate is determined (the "Candidate-anchor"), the existing Global-anchor may include the MAC address of the Candidate-anchor that will serve as the new Global anchor.

Figure 9:
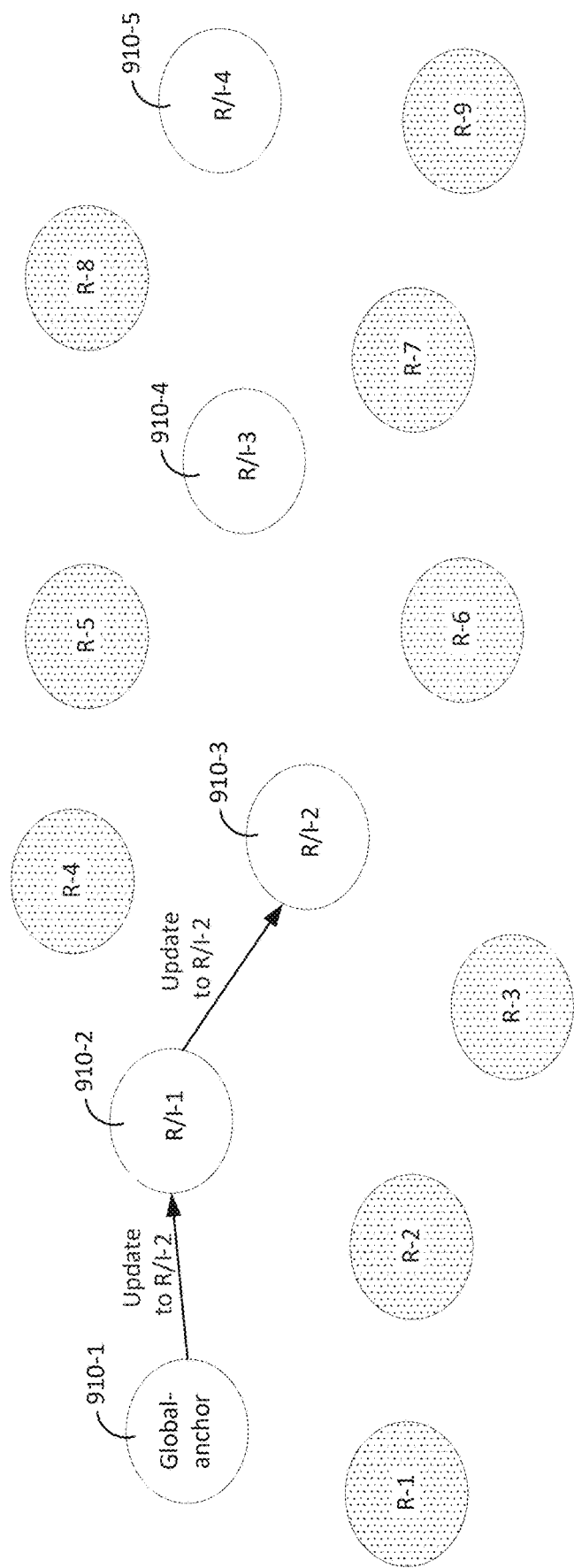
FIGS. 9 and 10 diagrams illustrating a process by which a new Global-anchor can be selected for time synchronization in a network of clusters, according to some embodiments.

FIG. 9 is a diagram provided as an example of how this process may be used to select a new Global-anchor for a network of clusters, according to an embodiment. The circles in FIG. 9 represent anchors in a network of clusters, with Init-anchors (910-1 to 910-5) and Resp-anchors. In this example, a first Init-anchor 910-1 comprises the Global-anchor for the network of clusters. For Init-anchors 910, a label of "R/I-x" indicates that the particular Init-anchor 910 comprises an Init-anchor of cluster x and a Resp-anchor of one or more other clusters. For example, for Init-anchor 910-3, the label "R/I-2" indicates that Init-anchor 910-3 is an Init-anchor for cluster 2, and a Resp-anchor for one or more other clusters (e.g., cluster 1). CC and/or related information may be relayed, for example, in a poll DTM message transmitted by the Global-anchor (Init-anchor 910-1) and propagated to the rest of the anchors in the network using the process described above with respect to FIG. 8, for example. If the Candidate-anchor is not in the same cluster as the current Global-anchor, then the Resp-anchor that is closest to the Candidate-anchor can repeat the process in its own cluster, where it serves as the Init-anchor.

In the example of FIG. 9, if the current Global-anchor (Init-anchor 910-1) determines that Init-anchor 910-3 is the Candidate-anchor that should be the new Global-anchor, it may send an update message (e.g., in a poll DTM in message) to Init-anchor 910-2 in an initial round for cluster 0 where Init-anchor 910-2 is a Resp-anchor. In a subsequent round for cluster 1, in which Init-anchor 910-2 is the Init-anchor and Init-anchor 910-3 is a Resp-anchor, Init-anchor 910-2 would send the update message to Init-anchor 910-3 (e.g., in a poll DTM in message for the separate cluster).

According to some embodiments, when the intended Candidate-anchor receives the instruction to become the new Global-anchor, it can then send an acknowledgment message to be propagated to the home network, which in turn instructs all the other Init-anchors to synchronize to its clock. In this case, each Init-anchor may relay the information by broadcasting in its own cluster (e.g., in the poll DTM message) using the process for message propagation described above with respect to FIG. 8, for example. In such embodiments, the poll DTM message may comprise a new field or IE in the "Message Control Format." This new field/IE could contain, for example, an element (e.g., a binary bit) indicating whether it is there is an update process or not. If yes, then another field (e.g., another binary bit) indicates whether the update is "update" or an "ACK." If it is an update, then the MAC address of Candidate-anchor can be included in the message. If it is an ACK, then the message can include a local timestamp at which the ACK was sent by candidate-anchor, for synchronization. According to some embodiments, the ACK message can include a block index (e.g., 8 bits) indicating when the new time reference will be used. This block index can be set for a time (e.g., sufficiently far enough in the future from one of the ACK messages initially sent by the candidate-anchor) that allows for the ACK message to be distributed to the whole network.

Figure 10:
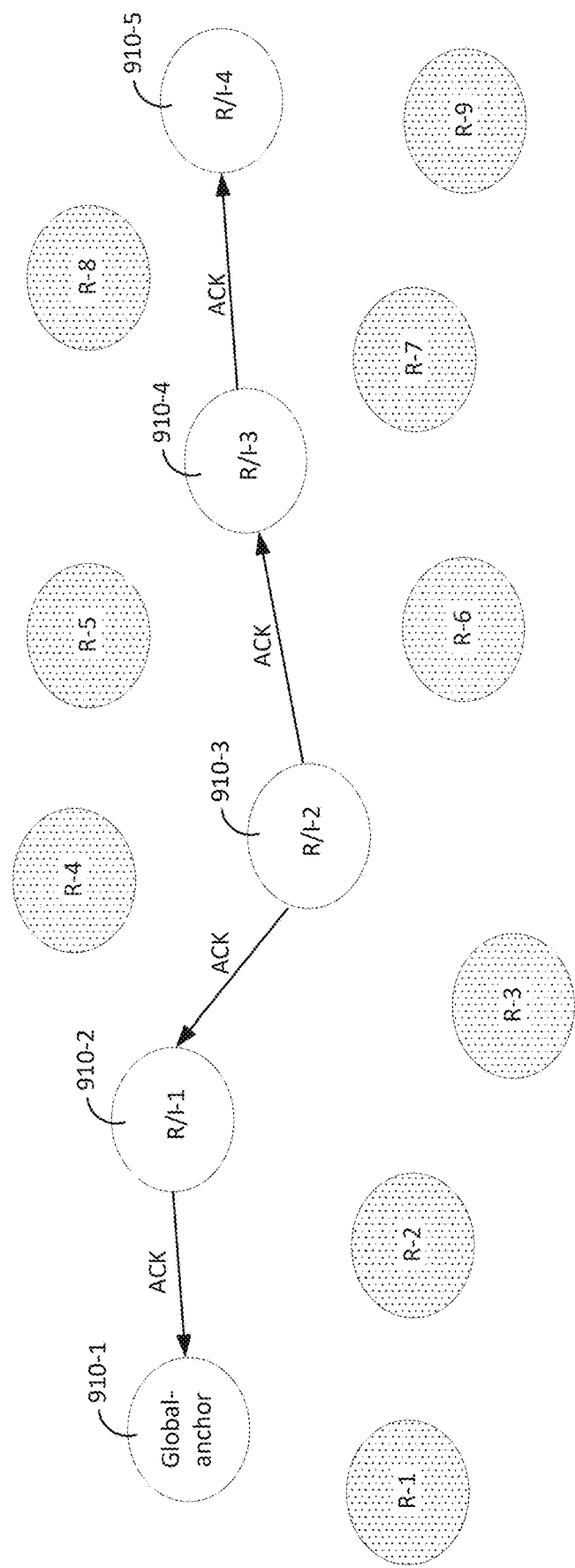

FIG. 10 illustrates how an acknowledgment of a new Global-anchor may be distributed in the cluster network of FIG. 9, according to this process. Here, the ACK message can be distributed from the Candidate-anchor, Init-anchor 910-3, to the rest of the Init-anchors 910 as illustrated. The actions shown in FIGS. 9 and 10 provide a complete process of updating and acknowledging a new Global-anchor in a network according to some embodiments.

Control information related to updating the Global-anchor (e.g., update and ACK messages, as described with respect to FIGS. 9 and 10) can be propagated with a network, according to some embodiments. In view of the process for propagating information in a network of clusters, e.g., as described above with respect to FIG. 8, the overall exchange of messages can take several ranging blocks to complete. However, this may cause scalability issues since it might require many ranging blocks before the update/ACK messages are received by all anchors. This can cause different parts of the network to operate on different time references if packet loss occurs. According to some embodiments, a possible way of avoiding this could be to have a 3-way handshake between the new global-anchor and all the other Init-anchors. Alternatively, the new Global-anchor could schedule a very distant ranging block (as previously noted) to ensure all anchors in the network are able to synchronize accordingly when operation on the new time reference begins.

Additionally or alternatively, embodiments may utilize a more scalable approach. In this approach, the last round of a block may be reserved for communication between the Init-Anchors alone. In such embodiments, each slot in this final round would represent an opportunity to exchange messages between all the Init-Anchors. According to some embodiments, CC-based metrics (and/or traditional CM-based metrics) may also be exchanged in this round. The slots in this final round can be reserved as a function of the cluster/Init-Anchor ID (known by Bluetooth advertisers and populated periodically). Further, according to some embodiments, each Init-Anchor may transmit the final-DTM message containing the relevant information. All anchors in the following ranging block would then be synchronized on the new time reference. According to some embodiments, this final-DTM message may be optional. In the context of TDoA, the final message may help perform double-sided two-way synchronization, as opposed to single-sided two-way synchronization (which is the default case with no final-DTM message).

According to the scalable approach, embodiments may utilize the same block structure used in current UWB positioning sessions (e.g., each timing block having multiple rounds), with an additional round(s) typically at the end of each block. That said, in some embodiments, an additional one or more rounds may occur elsewhere within the block, depending on desired functionality. Multiple additional rounds may be dispersed at multiple points within a block.

Figure 11:
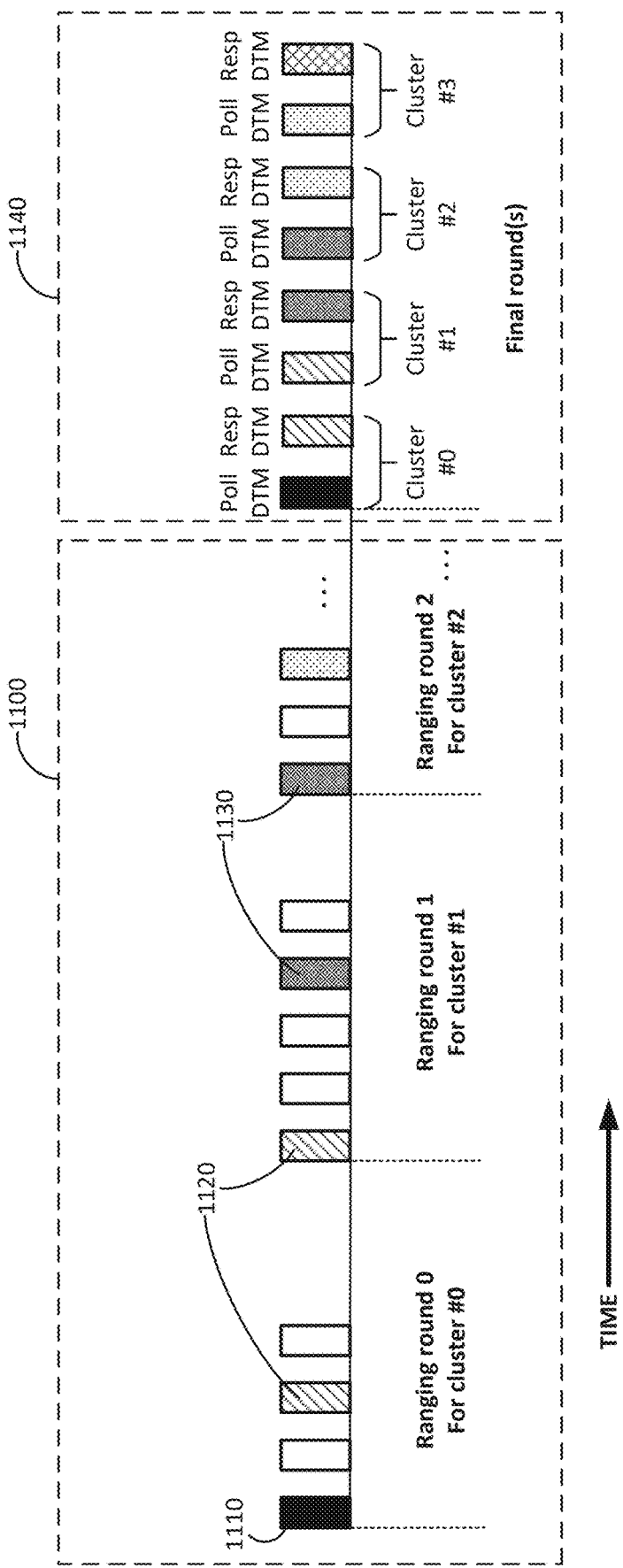
FIG. 11 is a diagram illustrating how one or more specialized rounds may be used to enhance inter-cluster communication, according to some embodiments.

FIG. 11 is a diagram illustrating an example of these rounds may be implemented, according to an embodiment. In this example, an initial set of rounds 1100 includes poll and response messages for downstream information to be passed from a first anchor (e.g., Global-anchor) 1110, to a second anchor 1120, to a third anchor 1130, and so on, as described previously with respect to FIG. 8. Here, however, a new set 1140 of one or more rounds can include poll and response messages that include in Init-anchors only, thereby allowing for more efficient distribution of control information (e.g., update and/or ACK messages designating a new global-anchor) among Init-anchors in the network, reducing latency.

According to some embodiments, a duration or number of slots in the final round(s) (e.g., new set 1140) could be computed by all Init-anchors using a globally known formula. One such formula could be:

$$T=C*k*\text{Slot Duration}$$

where C is the number of clusters and k is the number of slots for each cluster. As noted, this can significantly reduce the overall latency for the distribution of control information related to the designation of a new Global-anchor.

Depending on desired functionality, new set 1140 can be modified to introduce additional functionality. According to some embodiments, each pair of poll and response messages for a cluster (e.g., as shown in the new set 1140 in FIG. 11, where each pair represents a different cluster) may span two or more slots (which may be configurable) and may represent two-way communication between the Init-anchor and a Resp-anchor for the cluster. Further, different orders may be provided to facilitate communication in different directions. For example, as illustrated in FIG. 11, downstream information from cluster #0 cluster #3 may be completed in a single round, but upstream information from cluster #3 cluster #0 may take multiple rounds, given the order of the slots in the final round(s). However, some embodiments may include additional slots, or slots in a different order, to facilitate communications in other directions. For example, upstream communications from cluster #3 cluster #0 could be completed in a single round by reversing the order of the new set 1140 in FIG. 11. Depending on desired functionality, an additional round may be added (or additional slots may be added to an existing round) to provide this reverse order and reduce the latency for upstream communication.

Figure 12:
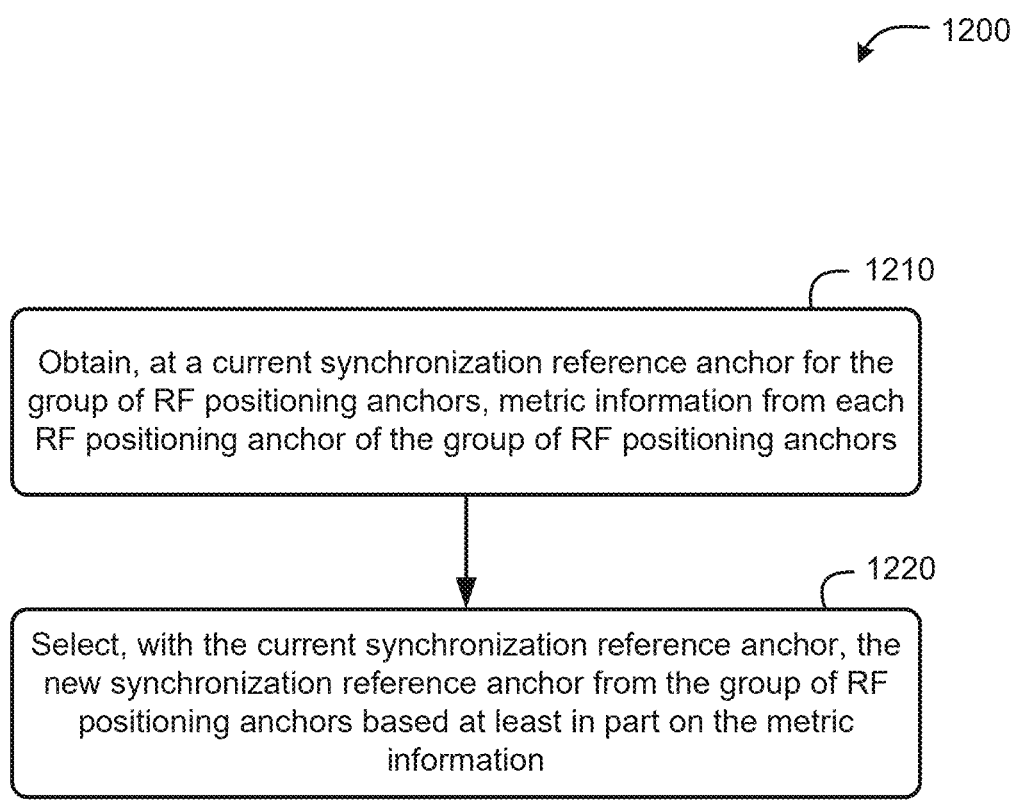
FIG. 12 is a flow diagram of a method of designating a new synchronization reference anchor for a group of RF positioning anchors to enable DL-TDOA positioning of mobile devices, according to an embodiment.

FIG. 12 is a flow diagram of a method 1200 designating a new synchronization reference anchor for a group of radio frequency (RF) positioning anchors to enable downlink Time Difference of Arrival (DL-TDoA) positioning of mobile devices, according to an embodiment. Means for performing the functionality illustrated in one or more of the blocks shown in FIG. 12 may be performed by hardware and/or software components of a mobile UWB device or stationary UWB device, for example. Example components of a mobile UWB device and a stationary UWB device are respectively illustrated in FIGS. 13 and 14, which are described in more detail below. That said, the method 1200 may be expanded to technologies beyond UWB, such as 5G.

At block 1210, the functionality comprises obtaining, at a current synchronization reference anchor for the group of RF positioning anchors, metric information from each RF positioning anchor of the group of RF positioning anchors. As described herein, each RF positioning anchor may comprise a UWB anchor (e.g., Init-anchor and/or Resp-anchor). In such instances, the current synchronization reference anchor may comprise a current Global-anchor. However, as previously noted, this functionality may be implemented in a network of 5G devices. As such, according to some embodiments, the RF positioning anchor of the group of RF positioning anchors may comprise a 5G NR anchor. As noted herein, the metric information may comprise any of a variety of types of information that can be used to determine a CM or CC value. For example, according to some embodiments, the metric information of a respective RF positioning anchor may comprise information regarding a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, or power consumption information of the respective RF positioning anchor, or a combination thereof.

Figure 13:
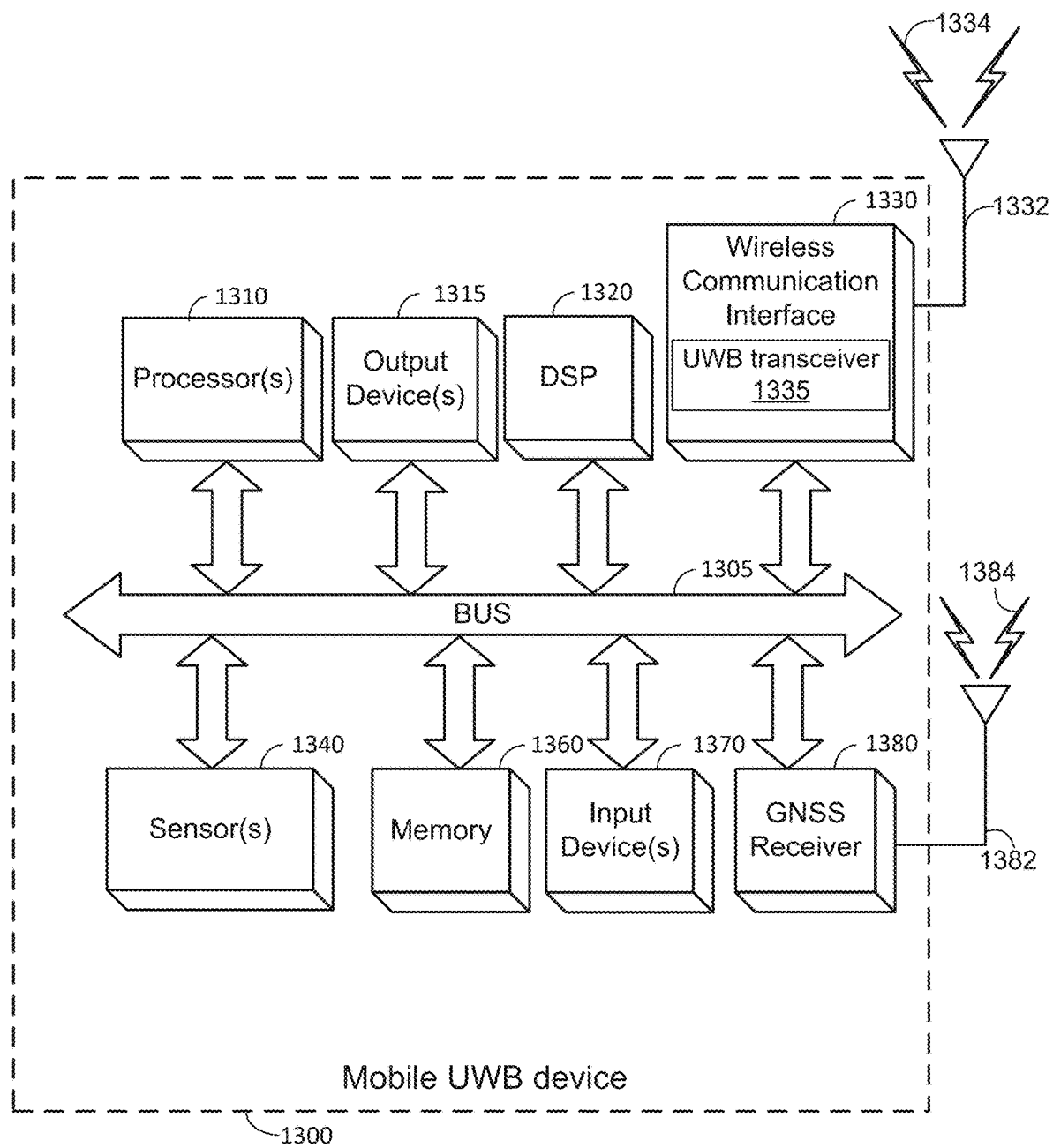
FIG. 13 is a block diagram of an embodiment of a mobile UWB device, which can be utilized in embodiments as described herein.
Figure 14:
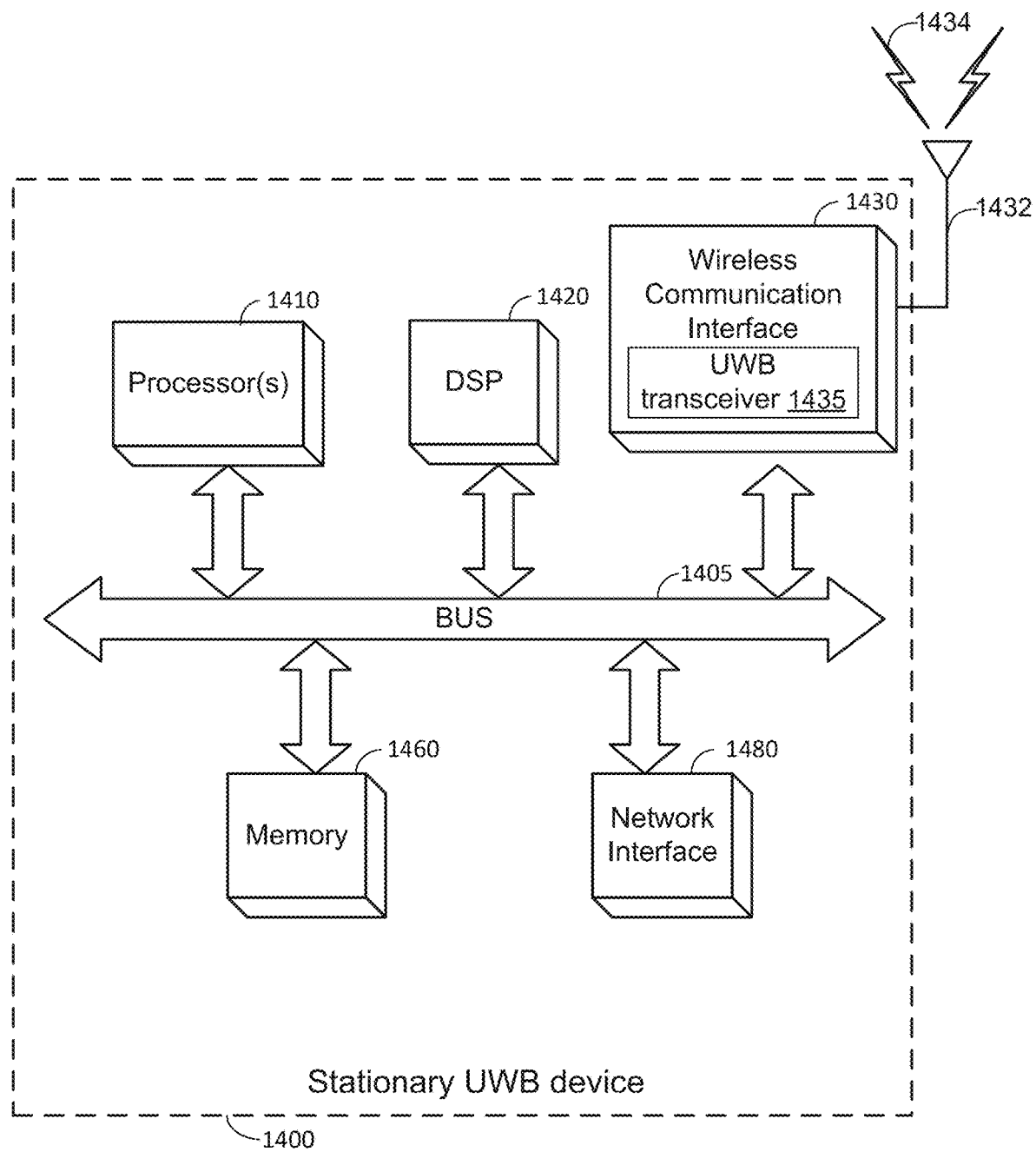
FIG. 14 is a block diagram of an embodiment of a stationary UWB device, which can be utilized in embodiments as described herein.

Means for performing functionality at block 1210 may comprise a bus 1305, processor(s) 1310, DSP 1320, memory 1360, wireless communication interface 1330 (e.g., including UWB transceiver 1335), and/or other components of a mobile UWB device 1300, as illustrated in FIG. 13. Additionally or alternatively, means for performing functionality at block 1210 may comprise a bus 1405, processor(s) 1410, DSP 1420, memory 1460, wireless communication interface 1430 (e.g., including UWB transceiver 1435), and/or other components of a stationary UWB device 1400, as illustrated in FIG. 14.

At block 1220, the functionality comprises selecting with the current synchronization reference anchor, the new synchronization reference anchor from the group of RF positioning anchors based at least in part on the metric information. As described in the embodiments herein, the selection may be based on a combined value of weighted metric information. As described herein with respect to determining a CC value, a distance (e.g., number of hops) and/or a number of nodes may also be used.

Means for performing functionality at block 1220 may comprise a bus 1305, processor(s) 1310, DSP 1320, memory 1360, wireless communication interface 1330 (e.g., including UWB transceiver 1335), and/or other components of a mobile UWB device 1300, as illustrated in FIG. 13. Additionally or alternatively, means for performing functionality at block 1220 may comprise a bus 1405, processor(s) 1410, DSP 1420, memory 1460, wireless communication interface 1430 (e.g., including UWB transceiver 1435), and/or other components of a stationary UWB device 1400, as illustrated in FIG. 14.

As noted in the embodiments described above, one or more additional features may be limited, as desired. For example, according to some embodiments the method may further comprise, responsive to selecting the new synchronization reference anchor, transmitting, from the current synchronization reference anchor, information indicative of the selected new synchronization reference anchor in a ranging round corresponding to a cluster comprising the current synchronization reference anchor. In such embodiments, each RF positioning anchor of the group of RF positioning anchors may comprise a UWB anchor. Further, transmitting the information indicative of the selected new synchronization reference anchor may comprise including the information indicative of the selected new synchronization reference anchor in a poll DTM message of the ranging round corresponding to the cluster comprising the current synchronization reference anchor. The group of RF positioning anchors may comprise a network of two or more clusters of UWB anchors and the current synchronization reference anchor comprises a current Global-anchor of the network. In such embodiments, transmitting the information indicative of the selected new synchronization reference anchor may comprise including the information indicative of the selected new synchronization reference anchor in a poll DTM message of a ranging round dedicated to communication between Init-anchors of the network. This dedicated ranging round may correspond to the new rounds described above with respect to FIG. 11 (e.g., new set 1140 of FIG. 11). Again, this dedicated round may comprise poll and Resp DTM messages corresponding to clusters within the group of RF positioning anchors (e.g., cluster network), which may be arranged by clusters in a same and/or different order than other rounds in a ranging block.

In some embodiments, the method may further comprise receiving a message at the current synchronization reference anchor, wherein the message indicates an acknowledgement from the selected new synchronization reference anchor, and timing information for using the selected new synchronization reference anchor as a synchronization reference and synchronizing the current synchronization reference anchor in accordance with the timing information. In such embodiments, the timing information may include a block index that indicates when the selected new synchronization reference anchor is to be used as the synchronization reference.

FIG. 13 is a block diagram of an embodiment of a mobile UWB device 1300, which can be utilized as described herein above. The mobile UWB device 1300 may correspond with a mobile device or tag for positioning has described herein. Additionally or alternatively, the mobile UWB device 1300 may serve as anchor in certain circumstances (e.g., when position of the mobile UWB device 1300 is known). It should be noted that FIG. 13 is meant only to provide a generalized illustration of various components, any or all of which may be utilized as appropriate. For example, more basic/simple types of UWB devices may omit various components that may be included in more advanced/complex UWB devices. Furthermore, as previously noted, the functionality of the UE discussed in the previously described embodiments may be executed by one or more of the hardware and/or software components illustrated in FIG. 13.

The mobile UWB device 1300 is shown comprising hardware elements that can be electrically coupled via a bus 1305 (or may otherwise be in communication, as appropriate). The hardware elements may include a processor(s) 1310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1310 may comprise one or more processing units, which may be housed in a single integrated circuit (IC) or multiple ICs. As shown in FIG. 13, some embodiments may have a separate DSP 1320, depending on desired functionality. Location determination and/or other determinations based on wireless communication may be provided in the processor(s) 1310 and/or wireless communication interface 1330 (discussed below). The mobile UWB device 1300 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The mobile UWB device 1300 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1300 to communicate with other devices as described in the embodiments above. The wireless communication interface 1330 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry.

As illustrated, the wireless indication interface 1330 may further comprise a UWB transceiver 1335. The UWB transceiver 1335 may be operated to perform the UWB operations described herein. Further, the wireless communications interface 1330 may comprise one or more additional communication technologies with which the OOB functionalities described herein may be performed. According to some embodiments, the UWB transceiver 1335 may be one of a plurality of UWB transceivers of the mobile UWB device 1300. Further, the UWB transceiver may be used for functionality in addition to the UWB positioning functionality described herein. Although illustrated as part of the wireless communication interface 1330, the UWB transceiver 1335 may be separate from the wireless communication interface 1330 in some embodiments.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1300 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1300 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 1300 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the mobile UWB device 1300, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1380 can be used with various+storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the mobile UWB device 1300 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the mobile UWB device 1300 (and/or processor(s) 1310 or DSP 1320 within mobile UWB device 1300). In some embodiments, then, such code and/or instructions can be used to configure and/or adapt a general-purpose computer (or other device) to perform one or more operations in accordance with the described methods.

FIG. 14 is a block diagram of an embodiment of a stationary UWB device 1400, which can be utilized as described herein above. For example, a stationary UWB device 1400 may be used as a UWB anchor as described herein. It should be noted that FIG. 14 is meant only to provide a generalized illustration of various components, any or all of which may be utilized as appropriate. In some embodiments, the UWB anchor 1400 may correspond to an anchor UWB having a known location, which may be used to determine the location of other UWB devices, including mobile UWB devices. According to some embodiments, the stationary UWB device 1400 may be permanently stationary or temporarily stationary.

The stationary UWB device 1400 is shown comprising hardware elements that can be electrically coupled via a bus 1405 (or may otherwise be in communication, as appropriate). The hardware elements may include a processor(s) 1410 which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processor(s) 1410 and/or wireless communication interface 1430 (discussed below), according to some embodiments. The stationary UWB device 1400 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The stationary UWB device 1400 might also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the stationary UWB device 1400 to communicate as described herein. The wireless communication interface 1430 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

As illustrated, the wireless indication interface 1430 may further comprise a UWB transceiver 1435. The UWB transceiver 1435 may be operated to perform the UWB operations described herein. Further, the wireless communications interface 1430 may comprise one or more additional communication technologies with which the OOB functionalities described herein may be performed. According to some embodiments, the UWB transceiver 1435 may be one of a plurality of UWB transceivers of the mobile UWB device 1400. Further, the UWB transceiver may be used for functionality in addition to the UWB positioning functionality described herein. Although illustrated as part of the wireless communication interface 1430, the UWB transceiver 1435 may be separate from the wireless communication interface 1430 in some embodiments.

The stationary UWB device 1400 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein. In some embodiments, the stationary UWB device 1400 may be communicatively coupled with one or more servers and/or other stationary UWB devices via the network interface 1480.

In many embodiments, the stationary UWB device 1400 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the stationary UWB device 1400 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the stationary UWB device 1400 (and/or processor(s) 1410 or DSP 1420 within stationary UWB device 1400). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of designating a new synchronization reference anchor for a group of radio frequency (RF) positioning anchors to enable downlink Time Difference of Arrival (DL-TDoA) positioning of mobile devices, the method comprising: obtaining, at a current synchronization reference anchor for the group of RF positioning anchors, metric information from each RF positioning anchor of the group of RF positioning anchors; and selecting, with the current synchronization reference anchor, the new synchronization reference anchor from the group of RF positioning anchors based at least in part on the metric information.

Clause 2. The method of clause 1, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, or power consumption information of the respective RF positioning anchor, or a combination thereof.

Clause 3. The method of any one of clauses 1-2 further comprising, responsive to selecting the new synchronization reference anchor, transmitting, from the current synchronization reference anchor, information indicative of the selected new synchronization reference anchor in a ranging round corresponding to a cluster comprising the current synchronization reference anchor.

Clause 4. The method of clause 3 wherein each RF positioning anchor of the group of RF positioning anchors comprises a UWB anchor.

Clause 5. The method of clause 4 wherein transmitting the information indicative of the selected new synchronization reference anchor comprises including the information indicative of the selected new synchronization reference anchor in a poll DTM message of the ranging round corresponding to the cluster comprising the current synchronization reference anchor.

Clause 6. The method of any one of clauses 4-5 wherein the group of RF positioning anchors comprises a network of two or more clusters of UWB anchors and the current synchronization reference anchor comprises a current global-anchor of the network.

Clause 7. The method of clause 6 wherein transmitting the information indicative of the selected new synchronization reference anchor comprises including the information indicative of the selected new synchronization reference anchor in a poll DTM message of a ranging round dedicated to communication between Init-anchors of the network.

Clause 8. The method of any one of clauses 1-7 wherein each RF positioning anchor of the group of RF positioning anchors comprises a Fifth Generation (5G) New Radio (NR) anchor.

Clause 9. The method of any one of clauses 1-8 further comprising receiving a message at the current synchronization reference anchor, wherein the message indicates: an acknowledgement from the selected new synchronization reference anchor, and timing information for using the selected new synchronization reference anchor as a synchronization reference; and synchronizing the current synchronization reference anchor in accordance with the timing information.

Clause 10. The method of clause 9 wherein the timing information includes a block index that indicates when the selected new synchronization reference anchor is to be used as the synchronization reference.

Clause 11. A device for designating a new synchronization reference anchor for a group of radio frequency (RF) positioning anchors to enable downlink Time Difference of Arrival (DL-TDoA) positioning of mobile devices, the device comprising: a transceiver; a memory; and one or more processors communicatively coupled with the transceiver and the memory, wherein the one or more processors are configured to: obtain, at a current synchronization reference anchor for the group of RF positioning anchors, metric information from each RF positioning anchor of the group of RF positioning anchors; and select, with the current synchronization reference anchor, the new synchronization reference anchor from the group of RF positioning anchors based at least in part on the metric information.

Clause 12. The device of clause 11, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, or power consumption information of the respective RF positioning anchor, or a combination thereof.

Clause 13. The device of any one of clauses 11-12 wherein the one or more processors are further configured to, responsive to selecting the new synchronization reference anchor, transmitting, from the current synchronization reference anchor, information indicative of the selected new synchronization reference anchor in a ranging round corresponding to a cluster comprising the current synchronization reference anchor.

Clause 14. The device of clause 13 wherein each RF positioning anchor of the group of RF positioning anchors comprises a UWB anchor.

Clause 15. The device of clause 14 wherein, to transmit the information indicative of the selected new synchronization reference anchor, the one or more processors are configured to include the information indicative of the selected new synchronization reference anchor in a poll DTM message of the ranging round corresponding to the cluster comprising the current synchronization reference anchor.

Clause 16. The device of any one of clauses 14-15 wherein the group of RF positioning anchors comprises a network of two or more clusters of UWB anchors and the current synchronization reference anchor comprises a current global-anchor of the network.

Clause 17. The device of clause 16 wherein, to transmit the information indicative of the selected new synchronization reference anchor, the one or more processors are configured to include the information indicative of the selected new synchronization reference anchor in a poll DTM message of a ranging round dedicated to communication between Init-anchors of the network.

Clause 18. The device of any one of clauses 11-17 wherein each RF positioning anchor of the group of RF positioning anchors comprises a Fifth Generation (5G) New Radio (NR) anchor.

Clause 19. The device of any one of clauses 11-18 wherein the one or more processors are further configured to: receive a message at the current synchronization reference anchor, wherein the message indicates: an acknowledgement from the selected new synchronization reference anchor, and timing information for using the selected new synchronization reference anchor as a synchronization reference; and synchronize the current synchronization reference anchor in accordance with the timing information.

Clause 20. The device of clause 19 wherein the timing information includes a block index that indicates when the selected new synchronization reference anchor is to be used as the synchronization reference.

Clause 21. An apparatus for designating a new synchronization reference anchor for a group of radio frequency (RF) positioning anchors to enable downlink Time Difference of Arrival (DL-TDoA) positioning of mobile devices, the apparatus comprising: means for obtaining, at a current synchronization reference anchor for the group of RF positioning anchors, metric information from each RF positioning anchor of the group of RF positioning anchors; and means for selecting, with the current synchronization reference anchor, the new synchronization reference anchor from the group of RF positioning anchors based at least in part on the metric information.

Clause 22. The apparatus of clause 21, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, or power consumption information of the respective RF positioning anchor, or a combination thereof.

Clause 23. The apparatus of any one of clauses 21-22 further comprising, responsive to selecting the new synchronization reference anchor, transmitting, from the current synchronization reference anchor, information indicative of the selected new synchronization reference anchor in a ranging round corresponding to a cluster comprising the current synchronization reference anchor.

Clause 24. The apparatus clause 23 wherein each RF positioning anchor of the group of RF positioning anchors comprises a UWB anchor.

Clause 25. The apparatus of clause 24 wherein the means for transmitting the information indicative of the selected new synchronization reference anchor comprises means for including the information indicative of the selected new synchronization reference anchor in a poll DTM message of the ranging round corresponding to the cluster comprising the current synchronization reference anchor.

Clause 26. The apparatus of any one of clauses 21-25 wherein the group of RF positioning anchors comprises a network of two or more clusters of UWB anchors and the current synchronization reference anchor comprises a current global-anchor of the network.

Clause 27. The apparatus of clause 26 wherein the means for transmitting the information indicative of the selected new synchronization reference anchor comprises means for including the information indicative of the selected new synchronization reference anchor in a poll DTM message of a ranging round dedicated to communication between Init-anchors of the network.

Clause 28. The apparatus of any one of clauses 21-27 wherein each RF positioning anchor of the group of RF positioning anchors comprises a Fifth Generation (5G) New Radio (NR) anchor.

Clause 29. The apparatus of any one of clauses 21-28 further comprising means for receiving a message at the current synchronization reference anchor, wherein the message indicates: an acknowledgement from the selected new synchronization reference anchor, and timing information for using the selected new synchronization reference anchor as a synchronization reference; and means for synchronizing the current synchronization reference anchor in accordance with the timing information.

Clause 30. The apparatus of clause 29 wherein the timing information includes a block index that indicates when the selected new synchronization reference anchor is to be used as the synchronization reference.

Clause 31. A non-transitory computer-readable medium storing instructions for designating a new synchronization reference anchor for a group of radio frequency (RF) positioning anchors to enable downlink Time Difference of Arrival (DL-TDoA) positioning of mobile devices, the instructions comprising code for: obtaining, at a current synchronization reference anchor for the group of RF positioning anchors, metric information from each RF positioning anchor of the group of RF positioning anchors; and selecting, with the current synchronization reference anchor, the new synchronization reference anchor from the group of RF positioning anchors based at least in part on the metric information.

Clause 32. The computer-readable medium of clause 31, wherein the metric information of a respective RF positioning anchor comprises information regarding: a time source accessible to the respective RF positioning anchor, a ground truth accuracy of a known location of the respective RF positioning anchor, a clock stability of the respective RF positioning anchor, a geographic location of the respective RF positioning anchor, a prevalence of Line of Sight (LoS) links of the respective RF positioning anchor, or power consumption information of the respective RF positioning anchor, or a combination thereof.

Clause 33. The computer-readable medium of any one of clauses 31-32 wherein the instructions further comprise code for, responsive to selecting the new synchronization reference anchor, transmitting, from the current synchronization reference anchor, information indicative of the selected new synchronization reference anchor in a ranging round corresponding to a cluster comprising the current synchronization reference anchor.

Clause 34. The computer-readable medium of clause 33 wherein each RF positioning anchor of the group of RF positioning anchors comprises a UWB anchor.

Clause 35. The computer-readable medium of clause 34 wherein the code for transmitting the information indicative of the selected new synchronization reference anchor comprises code for including the information indicative of the selected new synchronization reference anchor in a poll DTM message of the ranging round corresponding to the cluster comprising the current synchronization reference anchor.

Clause 36. The computer-readable medium of any one of clauses 34-35 wherein the group of RF positioning anchors comprises a network of two or more clusters of UWB anchors and the current synchronization reference anchor comprises a current global-anchor of the network.

Clause 37. The computer-readable medium of clause 36 wherein the code for transmitting the information indicative of the selected new synchronization reference anchor comprises code for including the information indicative of the selected new synchronization reference anchor in a poll DTM message of a ranging round dedicated to communication between Init-anchors of the network.

Clause 38. The computer-readable medium of any one of clauses 31-37 wherein each RF positioning anchor of the group of RF positioning anchors comprises a Fifth Generation (5G) New Radio (NR) anchor.

Clause 39. The computer-readable medium of any one of clauses 31-38 wherein the instructions further comprise code for: receiving a message at the current synchronization reference anchor, wherein the message indicates: an acknowledgement from the selected new synchronization reference anchor, and timing information for using the selected new synchronization reference anchor as a synchronization reference; and synchronizing the current synchronization reference anchor in accordance with the timing information.

Clause 40. The computer-readable medium of clause 39 wherein the timing information includes a block index that indicates when the selected new synchronization reference anchor is to be used as the synchronization reference.

What is claimed is:

1. A method of designating a new synchronization reference anchor for a group of radio frequency (RF) positioning anchors to enable downlink Time Difference of Arrival (DL-TDoA) positioning of mobile devices, the method comprising:
   obtaining, at a current synchronization reference anchor for the group of RF positioning anchors, metric information from each RF positioning anchor of the group of RF positioning anchors; and
   selecting, with the current synchronization reference anchor, the new synchronization reference anchor from the group of RF positioning anchors based at least in part on the metric information.

2. The method of claim 1, wherein the metric information of a respective RF positioning anchor comprises information regarding:
- a time source accessible to the respective RF positioning anchor,
- a ground truth accuracy of a known location of the respective RF positioning anchor,
- a clock stability of the respective RF positioning anchor,
- a geographic location of the respective RF positioning anchor,
- a prevalence of Line of Sight (LoS) links of the respective RF positioning anchor, or
- power consumption information of the respective RF positioning anchor, or a combination thereof.

3. The method of claim 1, further comprising, responsive to selecting the new synchronization reference anchor, transmitting, from the current synchronization reference anchor, information indicative of the selected new synchronization reference anchor in a ranging round corresponding to a cluster comprising the current synchronization reference anchor.

4. The method of claim 3, wherein each RF positioning anchor of the group of RF positioning anchors comprises a UWB anchor.

5. The method of claim 4, wherein transmitting the information indicative of the selected new synchronization reference anchor comprises including the information indicative of the selected new synchronization reference anchor in a poll DTM message of the ranging round corresponding to the cluster comprising the current synchronization reference anchor.

6. The method of claim 4, wherein the group of RF positioning anchors comprises a network of two or more clusters of UWB anchors and the current synchronization reference anchor comprises a current global-anchor of the network.

7. The method of claim 6, wherein transmitting the information indicative of the selected new synchronization reference anchor comprises including the information indicative of the selected new synchronization reference anchor in a poll DTM message of a ranging round dedicated to communication between Init-anchors of the network.

8. The method of claim 1, wherein each RF positioning anchor of the group of RF positioning anchors comprises a Fifth Generation (5G) New Radio (NR) anchor.

9. The method of claim 1, further comprising:
- receiving a message at the current synchronization reference anchor, wherein the message indicates:
  - an acknowledgement from the selected new synchronization reference anchor, and
  - timing information for using the selected new synchronization reference anchor as a synchronization reference; and
- synchronizing the current synchronization reference anchor in accordance with the timing information.

10. The method of claim 9, wherein the timing information includes a block index that indicates when the selected new synchronization reference anchor is to be used as the synchronization reference.

11. A device for designating a new synchronization reference anchor for a group of radio frequency (RF) positioning anchors to enable downlink Time Difference of Arrival (DL-TDoA) positioning of mobile devices, the device comprising:
- a transceiver;
- a memory; and
- one or more processors communicatively coupled with the transceiver and the memory, wherein the one or more processors are configured to:
  - obtain, at a current synchronization reference anchor for the group of RF positioning anchors, metric information from each RF positioning anchor of the group of RF positioning anchors; and
  - select, with the current synchronization reference anchor, the new synchronization reference anchor from the group of RF positioning anchors based at least in part on the metric information.

12. The device of claim 11, wherein the metric information of a respective RF positioning anchor comprises information regarding:
- a time source accessible to the respective RF positioning anchor,
- a ground truth accuracy of a known location of the respective RF positioning anchor,
- a clock stability of the respective RF positioning anchor,
- a geographic location of the respective RF positioning anchor,
- a prevalence of Line of Sight (LoS) links of the respective RF positioning anchor, or
- power consumption information of the respective RF positioning anchor, or
- a combination thereof.

13. The device of claim 11, wherein the one or more processors are further configured to, responsive to selecting the new synchronization reference anchor, transmitting, from the current synchronization reference anchor, information indicative of the selected new synchronization reference anchor in a ranging round corresponding to a cluster comprising the current synchronization reference anchor.

14. The device of claim 13, wherein each RF positioning anchor of the group of RF positioning anchors comprises a UWB anchor.

15. The device of claim 14, wherein, to transmit the information indicative of the selected new synchronization reference anchor, the one or more processors are configured to include the information indicative of the selected new synchronization reference anchor in a poll DTM message of the ranging round corresponding to the cluster comprising the current synchronization reference anchor.

16. The device of claim 14, wherein the group of RF positioning anchors comprises a network of two or more clusters of UWB anchors and the current synchronization reference anchor comprises a current global-anchor of the network.

17. The device of claim 16, wherein, to transmit the information indicative of the selected new synchronization reference anchor, the one or more processors are configured to include the information indicative of the selected new synchronization reference anchor in a poll DTM message of a ranging round dedicated to communication between Init-anchors of the network.

18. The device of claim 11, wherein each RF positioning anchor of the group of RF positioning anchors comprises a Fifth Generation (5G) New Radio (NR) anchor.

19. The device of claim 11, wherein the one or more processors are further configured to:
- receive a message at the current synchronization reference anchor, wherein the message indicates:
  - an acknowledgement from the selected new synchronization reference anchor, and
  - timing information for using the selected new synchronization reference anchor as a synchronization reference; and synchronize the current synchronization reference anchor in accordance with the timing information.

20. The device of claim 19, wherein the timing information includes a block index that indicates when the selected new synchronization reference anchor is to be used as the synchronization reference.

21. An apparatus for designating a new synchronization reference anchor for a group of radio frequency (RF) positioning anchors to enable downlink Time Difference of Arrival (DL-TDoA) positioning of mobile devices, the apparatus comprising:
- means for obtaining, at a current synchronization reference anchor for the group of RF positioning anchors, metric information from each RF positioning anchor of the group of RF positioning anchors; and
- means for selecting, with the current synchronization reference anchor, the new synchronization reference anchor from the group of RF positioning anchors based at least in part on the metric information.

22. The apparatus of claim 21, wherein the metric information of a respective RF positioning anchor comprises information regarding:
- a time source accessible to the respective RF positioning anchor,
- a ground truth accuracy of a known location of the respective RF positioning anchor,
- a clock stability of the respective RF positioning anchor,
- a geographic location of the respective RF positioning anchor,
- a prevalence of Line of Sight (LoS) links of the respective RF positioning anchor, or
- power consumption information of the respective RF positioning anchor, or
- a combination thereof.

23. The apparatus of claim 21, further comprising, responsive to selecting the new synchronization reference anchor, transmitting, from the current synchronization reference anchor, information indicative of the selected new synchronization reference anchor in a ranging round corresponding to a cluster comprising the current synchronization reference anchor.

24. The apparatus of claim 23, wherein each RF positioning anchor of the group of RF positioning anchors comprises a UWB anchor.

25. The apparatus of claim 24, wherein the group of RF positioning anchors comprises a network of two or more clusters of UWB anchors and the current synchronization reference anchor comprises a current global-anchor of the network.

26. The apparatus of claim 21, wherein each RF positioning anchor of the group of RF positioning anchors comprises a Fifth Generation (5G) New Radio (NR) anchor.

27. The apparatus of claim 21, further comprising:
- means for receiving a message at the current synchronization reference anchor, wherein the message indicates:
  - an acknowledgement from the selected new synchronization reference anchor, and
  - timing information for using the selected new synchronization reference anchor as a synchronization reference; and
- means for synchronizing the current synchronization reference anchor in accordance with the timing information.

28. A non-transitory computer-readable medium storing instructions for designating a new synchronization reference anchor for a group of radio frequency (RF) positioning anchors to enable downlink Time Difference of Arrival (DL-TDoA) positioning of mobile devices, the instructions comprising code for:
- obtaining, at a current synchronization reference anchor for the group of RF positioning anchors, metric information from each RF positioning anchor of the group of RF positioning anchors; and
- selecting, with the current synchronization reference anchor, the new synchronization reference anchor from the group of RF positioning anchors based at least in part on the metric information.

29. The non-transitory computer-readable medium of claim 28, wherein the metric information of a respective RF positioning anchor comprises information regarding:
- a time source accessible to the respective RF positioning anchor,
- a ground truth accuracy of a known location of the respective RF positioning anchor,
- a clock stability of the respective RF positioning anchor,
- a geographic location of the respective RF positioning anchor,
- a prevalence of Line of Sight (LoS) links of the respective RF positioning anchor, or
- power consumption information of the respective RF positioning anchor, or
- a combination thereof.

* * * * *